US011890662B2

(12) United States Patent
Song et al.

(10) Patent No.: US 11,890,662 B2
(45) Date of Patent: Feb. 6, 2024

(54) METHOD FOR MANUFACTURING OUT PLATE FOR REFRIGERATOR

(71) Applicant: LG ELECTRONICS INC., Seoul (KR)

(72) Inventors: Seongmin Song, Seoul (KR); Youngju Hwang, Seoul (KR); Kunhyung Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/204,132

(22) Filed: Mar. 17, 2021

(65) Prior Publication Data

US 2021/0291251 A1 Sep. 23, 2021

(30) Foreign Application Priority Data

Mar. 18, 2020 (KR) ........................ 10-2020-0033461

(51) Int. Cl.
*B21D 28/26* (2006.01)
*B21D 28/34* (2006.01)
*B41M 1/28* (2006.01)

(52) U.S. Cl.
CPC ........... *B21D 28/265* (2013.01); *B21D 28/34* (2013.01); *B41M 1/28* (2013.01)

(58) Field of Classification Search
CPC ..... B21D 28/265; B21D 28/34; F25D 29/005; F25D 23/028; F25D 2400/361; B41M 1/28

(Continued)

(56) References Cited

U.S. PATENT DOCUMENTS 5,992,280 A * 11/1999 Oishi .................. B21D 45/006 72/334
9,739,527 B2 8/2017 Kim et al.
(Continued)

FOREIGN PATENT DOCUMENTS

CN 105051474 11/2015
CN 105276905 1/2016
(Continued)

OTHER PUBLICATIONS

Office Action in Korean Appln. No. 10-2020-0033461, dated Oct. 27, 2021, 13 pages (with English translation).
(Continued)

*Primary Examiner* — Nhat Chieu Q Do
(74) *Attorney, Agent, or Firm* — Fish & Richardson P.C.

(57) ABSTRACT

A method for manufacturing an out plate for a refrigerator includes providing a steel plate with a protective film attached to a surface thereof; seating the steel plate on a die and forming one of the plurality of through holes by a vertical movement of a punch; and horizontally moving the steel plate to one of a plurality of set positions to form another one of the plurality of through holes in the steel plate by the vertical movement of the punch, wherein the out plate defines a front surface of a door of the refrigerator and includes a display part, wherein a plurality of through holes are formed therein, and a display assembly comprising a plurality of light emitting diodes (LEDs) that are configured to transmit light through the plurality of through holes configured to display information.

12 Claims, 25 Drawing Sheets

(58) Field of Classification Search
USPC .............................................................. 83/413
See application file for complete search history.

(56) References Cited

U.S. PATENT DOCUMENTS

| | | | |
|---|---|---|---|
| 9,791,204 | B2 | 10/2017 | Kim et al. |
| 10,808,993 | B2 | 10/2020 | Joo et al. |
| 2010/0021762 | A1 * | 1/2010 | Zheng ..................... B44C 3/042 156/196 |
| 2015/0192352 | A1 | 7/2015 | Sung et al. |
| 2016/0117022 | A1 * | 4/2016 | Kim ................... H03K 17/9643 345/82 |
| 2017/0089633 | A1 | 3/2017 | Kim et al. |
| 2017/0234609 | A1 * | 8/2017 | Park ...................... F25D 29/005 345/174 |
| 2017/0299259 | A1 * | 10/2017 | Lee ....................... F25D 23/126 |
| 2019/0170434 | A1 | 6/2019 | Kim et al. |
| 2019/0285334 | A1 | 9/2019 | Zhang et al. |

FOREIGN PATENT DOCUMENTS

| | | | | |
|---|---|---|---|---|
| CN | 106104182 | | 11/2016 | |
| CN | 106123454 | | 11/2016 | |
| CN | 109883131 | | 6/2019 | |
| CN | 110732591 | | 1/2020 | |
| EP | 3147609 | | 3/2017 | |
| EP | 3147609 | A1 * | 3/2017 | ......... A47L 15/4293 |
| EP | 2789943 | | 5/2018 | |
| EP | 3333515 | A1 * | 6/2018 | ............... A47F 3/00 |
| EP | 3460367 | | 3/2019 | |
| EP | 3460367 | A1 * | 3/2019 | ............. B21D 28/34 |
| KR | 20070121276 | | 12/2007 | |
| KR | 20110101439 | | 9/2011 | |
| KR | 1020140121753 | | 10/2014 | |
| KR | 20150081800 | | 7/2015 | |
| KR | 20170037467 | | 4/2017 | |
| KR | 1020170045062 | | 4/2017 | |

OTHER PUBLICATIONS

Office Action in Chinese Appln. No. 202110284515.9, dated Jun. 29, 2022, 11 pages (with English translation).
Extended European Search Report in European Appln. No. 21163055.3, dated Jul. 16, 2021, 8 pages.
Extended European Search Report in European Appln. No. 23193200.5, dated Nov. 29, 2023, 8 pages.

* cited by examiner

METHOD FOR MANUFACTURING OUT PLATE FOR REFRIGERATOR

CROSS-REFERENCE TO RELATED APPLICATIONS

The present application claims priority under 35 U.S.C. 119 and 35 U.S.C. 365 to Korean Patent Application No. 10-2020-0033461, filed on Mar. 18, 2020, the disclosure of which is hereby incorporated by reference in its entirety.

TECHNICAL FIELD

The present disclosure relates to a method for manufacturing an out plate for a refrigerator.

BACKGROUND

Refrigerators may be defined as a home appliance used for low-temperature storage of food in an internal storage space that is shielded by a door. In some implementations, the refrigerator can be configured to store foods in an optimal state by cooling the inside of the storage space using cold air generated through heat exchange with a refrigerant circulating through a refreezing cycle.

In recent years, a refrigerator has gradually become larger in size and multifunctional in accordance with changes in dietary patterns and the trend of high-end products. Accordingly, refrigerators with various structures and convenient features that enable convenient and efficient use of the internal space thereof are being released.

For example, a display part for displaying an operating state of a refrigerator can be provided on the door of the refrigerator. In addition, the display part may display various types of information according to the operation of the refrigerator in the form of numbers, letters, symbols, or pictures.

Accordingly, a user can check information output through the display assembly, determine the operating state of the refrigerator, and perform operation commands for the operation of the refrigerator.

In some implementations, a front surface of a refrigerator door can be formed of an out plate typically made of a metal material, a display part can be coupled to the out plate by a plurality of through holes in the out plate, and information can be displayed by light passing through relevant through holes when light-emitting diodes (LEDs) are turned on. In addition, etching can be used to form the through holes such that the through holes are formed in a fine size.

However, in the conventional refrigerator, the size of the through holes may not be uniform when the fine holes are formed by etching and the appearance thereof can be uneven. In addition, an etching process may be relatively costly and require a lot of time for the entire process.

In some implementations, the through holes can be formed by laser processing, but a coating layer around the through hole can be damaged by thermal deformation during the laser processing. In addition, additional post-processing may be required to remove burrs generated after forming the through holes. In addition, manufacturing cost can be remarkably high when laser processing is used.

SUMMARY

The present disclosure describes a method of manufacturing an out plate for a refrigerator that can improve the appearance of a display part and improve identification performance by enabling the formation of a fine through hole having a uniform diameter.

The present disclosure also describes a method for manufacturing an out plate for a refrigerator that can improve the appearance thereof by preventing deformation of a portion adjacent to a through hole and removing burrs around the through hole during a process of forming the through hole.

The present disclosure further describes a method for manufacturing an out plate for a refrigerator wherein a manufacturing process is simplified and productivity is improved.

The present disclosure further describes a method for manufacturing an out plate for a refrigerator that can significantly reduce time and cost for forming a through hole by forming the through hole by punching.

The present disclosure further describes a method for manufacturing an out plate for a refrigerator that can further improve the appearance thereof by preventing a hole-filling member from being unfilled in a through hole.

According to one aspect of the subject matter described in this application, a method for manufacturing an out plate for a refrigerator, wherein the out plate defines a front surface of a door of the refrigerator and includes: a display part, wherein a plurality of through holes are formed therein; and a display assembly including a plurality of light emitting diodes (LEDs) that are configured to transmit light through the plurality of through holes configured to display information, can include: providing a steel plate with a first protective film attached to a front surface thereof; seating the steel plate on a die and forming one of the plurality of through holes by a vertical movement of a punch; and horizontally moving the steel plate to one of a plurality of set positions to form another one of the plurality of through holes in the steel plate by the vertical movement of the punch, wherein each of the plurality of through holes can be formed by sequentially penetrating the first protective film and the steel plate with the punch, wherein the horizontal moving of the steel plate and the forming of one of the plurality of through holes by the vertical movement of the punch can be repeatedly performed while the steel plate is seated on the die at other ones of the plurality of set positions.

Implementations according to this aspect can include one or more of the following features. For example, the plurality of set positions can correspond to a plurality of positions of the plurality of through holes. In some implementations, a rear surface of the steel plate can be in contact with an upper surface of the die, and wherein the front surface of the steel plate defines an outer surface of the door.

In some implementations, the steel plate can be moved in a direction horizontal to the upper surface of the die, and wherein the steel plate can be in contact with a die protrusion protruding from the upper surface of the die. In some examples, wherein a burr, formed by the punch on the rear surface of the steel plate around one of the plurality of through holes, can be removed by the steel plate being in contact with the die protrusion when the steel plate is horizontally moved, and wherein a planarization region can be formed from where the burr is removed around the one of the plurality of through holes.

In some implementations, wherein one of the plurality of through holes may have a diameter of 0.4 mm to 0.7 mm, and wherein a movement distance of the steel plate can be in a range of tens of μm to several mm.

In some implementations, the method can further include: attaching a diffusion sheet configured to shield the plurality of through holes on the rear surface of the steel plate.

In some examples, the method can further include: based on attaching the diffusion sheet, providing a hole-filling material through an open front surface of one of the plurality of through holes to form a hole-filling member configured to shield the one of the plurality of through holes, wherein the hole-filling member can be configured to allow transmission of light.

In some implementations, the hole-filling material can be provided to a height corresponding to the first protective film. In some implementations, the method can further include: removing the first protective film after the hole-filling member is formed, wherein a thickness of the first protective film can have a thickness of 50 mm or less.

In some implementations, the method can further include: removing the first protective film after the hole-filling member is formed; and defining an operation part configured to guide a users operation in the front surface of the steel plate. In some examples, the operation part can be defined on the front surface of the steel plate by printing or surface processing. In some implementations, the hole-filling material can be provided simultaneously in the plurality of through holes by a printing method.

In some implementations, the method can further include: removing the first protective film after the hole-filling member is formed; and attaching a second protective film configured to shield the entire front surface of the steel plate including a front surface of the hole-filling member. In some examples, the thickness of the first protective film can be formed to be thinner than a thickness of the second protective film. In some implementations, the second protective film can be removed after the steel plate is assembled to the door, and after the steel plate has been subjected to sheet metal processing. In some implementations, the front surface of the hole-filling member can be formed to protrude more than the front surface of the steel plate when the second protective film is removed.

In some implementations, the steel plate can be one of a stainless steel plate, a pre-coated metal (PCM) steel plate, or a vinyl-coated metal (VCM) steel plate.

In some implementations, one of the plurality of through holes can be formed such that a diameter at a front surface thereof is smaller than a diameter at a rear surface thereof.

In some implementations, a stripper configured to guide the vertical movement of the punch can be moved up and down together with the punch, and wherein a lower surface of the stripper can be configured to fix the steel plate by pressing the upper surface of the steel plate.

DETAILED DESCRIPTIONS

Figure 1:
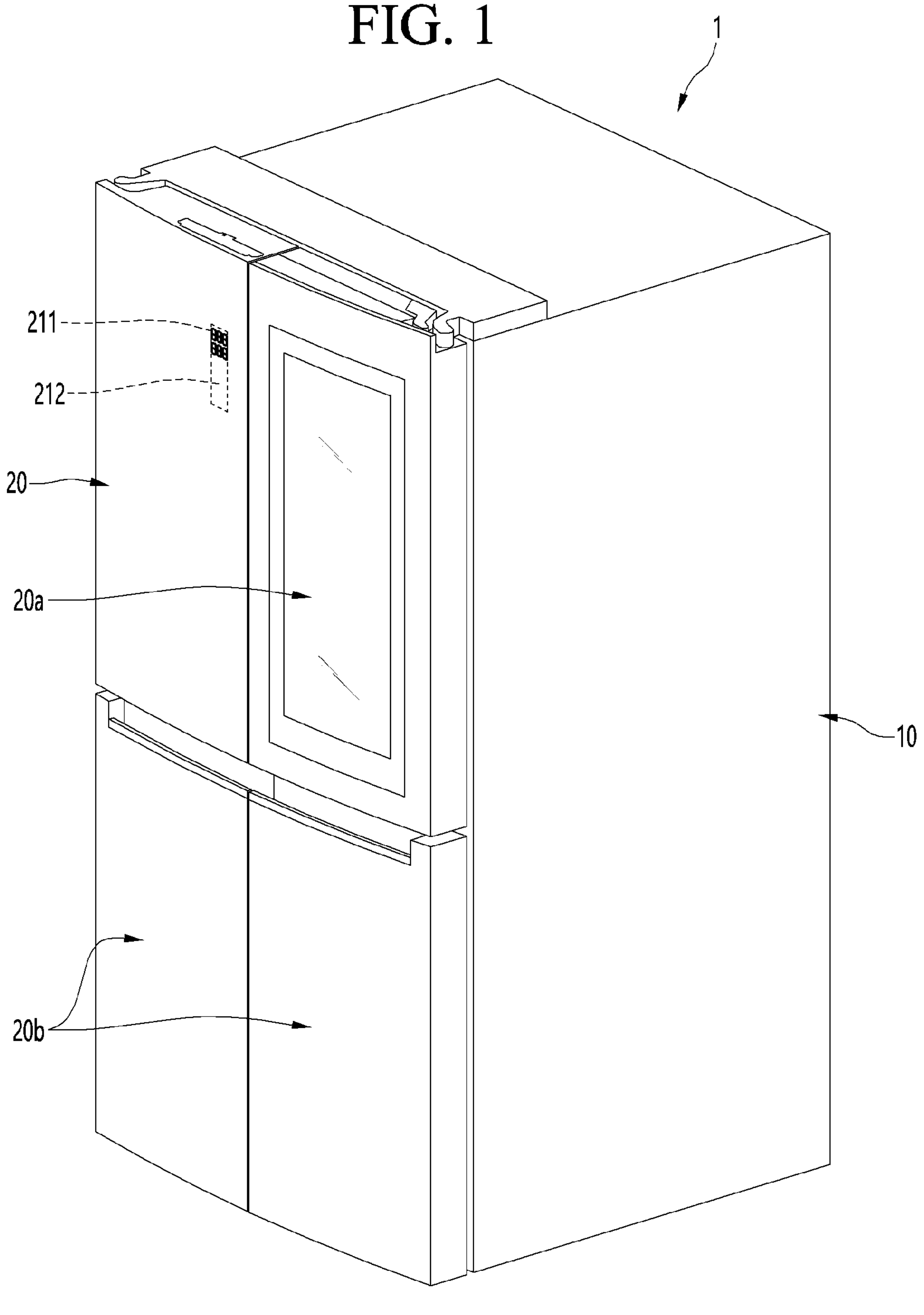
FIG. 1 is a front perspective view showing an example configuration of a refrigerator.

Hereinafter, some implementations of the present disclosure will be described in detail with reference to the exemplary drawings. In adding reference numerals to the components of each figure, it should be noted that the same reference numerals are assigned to the same components as much as possible even though they are shown in different figures. In addition, in describing implementations of the present disclosure, a detailed description of known configurations or functions thereof may be omitted when it is determined that it is obvious to those skilled in the art.

FIG. 1 is a perspective view of a refrigerator according to an implementation of the present disclosure.

For the convenience of description and understanding, directions are defined. Hereinafter, a direction toward the floor surface on which the refrigerator 1 is installed may be referred to as a downward direction, and a direction toward a top surface of a cabinet 10 opposite thereto may be referred to as an upward direction. In addition, a direction toward a door 20 may be referred to as a front direction and a direction toward the inside of the cabinet 10 based on the door 20 may be referred to as a rear direction. When an undefined direction is to be described, the direction may be defined and described based on each figure.

As shown in the figures, a refrigerator 1 according to an implementation of the present disclosure may include a cabinet 10 defining a storage space and doors 20, 20*a* and 20*b* mounted on the front surface of the cabinet 10 to open and close the storage space. An outer appearance of the refrigerator 1 may be defined by the cabinet 10 and the doors 20, 20*a* and 20*b*.

The storage space of the cabinet 10 may be divided vertically, wherein a refrigerating chamber may be provided on the upper side, and a freezing chamber may be provided on the lower side. A plurality of doors 20, 20*a* and 20*b* may be provided on an opened front surface of the storage space for opening and closing the storage space. The doors 20, 20*a* and 20*b* may be configured to open and close the storage space in a sliding or rotating manner, and may be configured to define a front outer appearance of the refrigerator 1 when the doors are closed.

The doors may include a pair of refrigerating chamber doors 20 and 20*a* to shield the refrigerating chamber and a pair of freezing chamber doors 20*b* to shield the freezing chamber. Each of the pair of refrigerating chamber doors 20 and 20*a* and the freezing chamber doors 20*b* may be configured to be rotatably coupled to the cabinet 10 at left and right ends and to open and close the refrigerating chamber and the freezing chamber by rotation.

In some implementations, a dispenser for dispensing water or ice may be provided on the front surface of the refrigerating chamber door 20. In some implementations, the right refrigerator chamber door 20*a* of the refrigerator chamber doors 20 and 20*a*, wherein the refrigerator chamber doors 20 and 20*a* are disposed on the left and right sides, respectively, may comprise a separate door storage space, a main door with an opening, and a sub door for opening and closing the main door. A portion of the sub door may be configured to be selectively transparent such that the door storage space is visible.

In addition, a display part 211 and a touch operation part 212 may be provided on the refrigerating chamber door 20 at a height that facilitates operation and identification by a user. Hereinafter, since the structure of the display part 211 and the touch operation part 212 will be described, the refrigerating chamber door 20 on the left side will be referred to as a door 20. In addition, it should be noted in advance that the implementation of the present disclosure is not limited to the left refrigerating chamber door 20, and may be applied to all doors in which the display part 211 and the touch operation part 212 may be provided.

Figure 2:
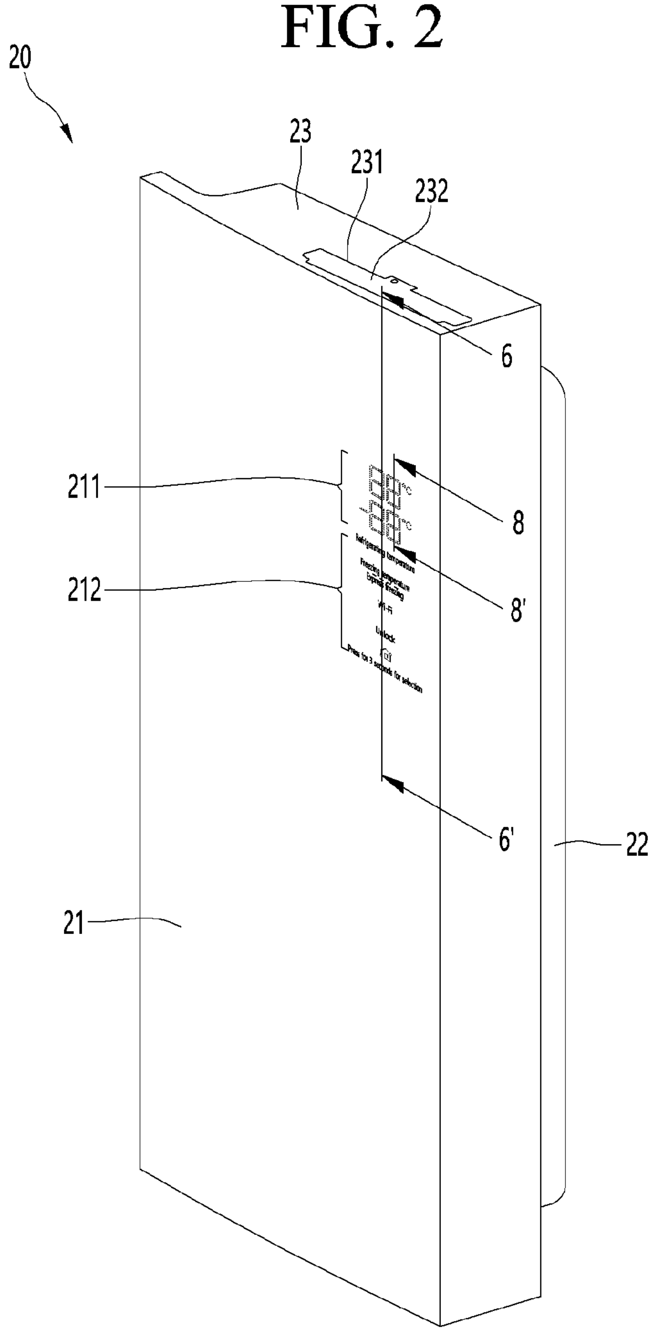
FIG. 2 is a front perspective view showing an example configuration of a door of the refrigerator.
Figure 3:
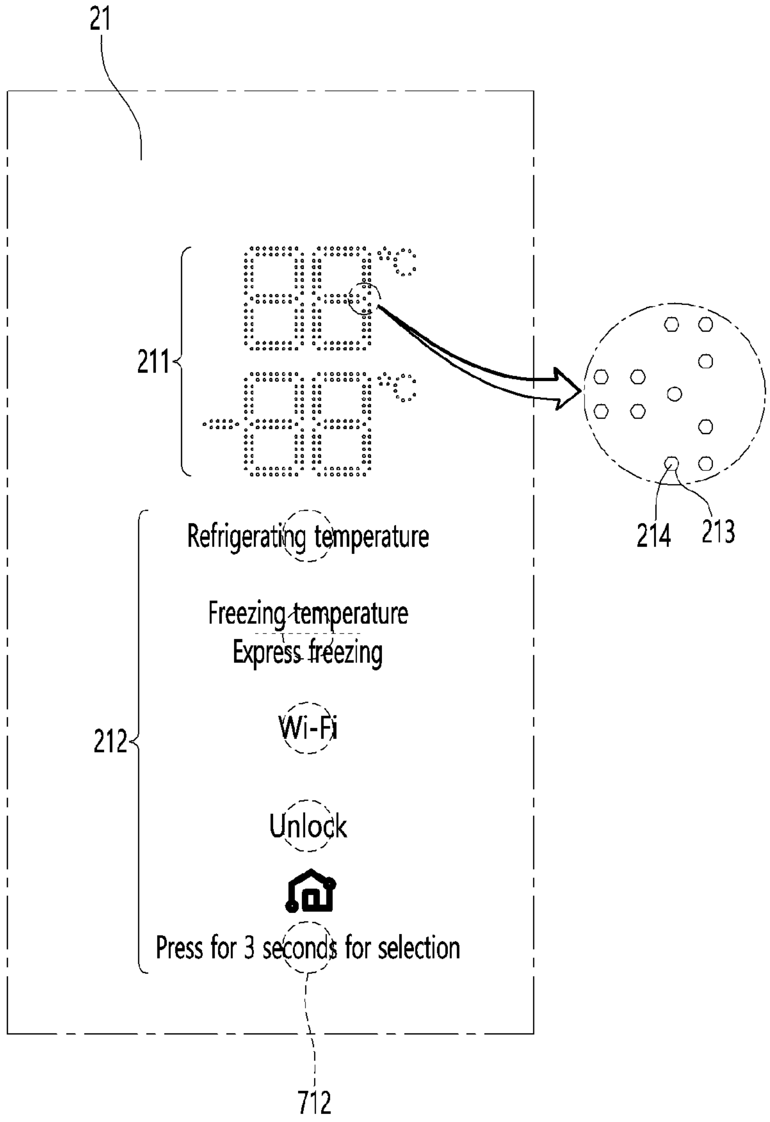
FIG. 3 is an enlarged view showing an example configuration of a display part and a touch operation part of the door.

FIG. 2 is a perspective view of a door of the refrigerator. In addition, FIG. 3 is an enlarged view of a display part and a touch operation part of the door.

As shown in the figures, the door 20 may include an out plate 21 defining a front appearance, a door liner 22 defining a rear appearance, and cap decors 23 provided at the top and bottom of the door 20 and the overall appearance thereof may be defined by the combination of the out plate 21, the door liner 22, and cap decors 23 as a whole.

In more detail, the out plate 21 defines the front appearance of the door 20 and may be made of a plate-shaped metal material. The out plate 21 may be made of a stainless steel plate or a color steel plate (VCM, PCM) formed to have a stainless texture. For example, the out plate may be formed to have a thickness of approximately 0.5 mm. The front surface of the out plate 21 exposed to the outside may be subjected to an anti-fingerprint treatment, and a specific color, a pattern, or a design may be printed. Further, the out plate 21 may be formed to have a metal hairline texture.

In some implementations, the display part 211 and the touch operation part 212 may be provided in the out plate.

The display part 211, which is for displaying operation states of the refrigerator 1 toward the outside, may be configured such that symbols, numbers or the like can be displayed while light emitted from the inside of the door 20 is transmitted through the display part, through which operation information of the refrigerator 1 can be checked by a user from the outside.

In some implementations, the display part 211 may be viewed from the outside by a plurality of through holes 213 formed in a portion of the out plate 21. The display part 211 may be defined as a plurality of through holes 213 continuously formed in a predetermined arrangement so as to represent numbers or symbols. For example, the plurality of through holes 213 may be arranged in a form of seven segments, and may be arranged to represent a specific symbol, a shape of a design, or letters indicating the operation state of the refrigerator 1.

In some implementations, the through holes 213 may be formed to correspond to the arrangement of a plurality of through holes 312 and 614 described below, so that the light emitted from a light emitting member 511 of a display assembly 40 can be transmitted there through. In addition, the through hole 213 formed in the out plate 21 is referred to as a first through hole 213 to be distinguished from the through holes 312 and 614 provided in the display assembly 40 and the display cover 30.

In some implementations, the first through hole 213 may be formed as a fine hole having a small diameter. For example, the first through hole 213 may be formed to have a diameter of 0.4 mm to 0.7 mm, and may be formed in various manners such as laser processing, etching, or NCT (Numerical Control Turret) punch processing. In some implementations, the first through hole 213 has a fine size, and a hole-filling member 214 is filled in the first through hole 213, so that the light emitting member 511 may not be easily exposed to the outside when the light emitting member 511 is not turned on. In addition, when the light emitting member 511 is turned on, the first through hole 213 may transmit light so that information can be displayed.

In detail, light is emitted through some of the first through holes 213 disposed at a position corresponding to the position of the light emitting member 511 from which light is emitted. In addition, the first through holes 213 to which light is emitted represent a specific number, letter, or the like, thus transmitting information to the user.

In some implementations, when at least some of the light emitting members 511 are turned on, the first through holes 213 corresponding to the light emitting members 511 that are turned on, among the plurality of first through holes 213 transmit light, enabling the first through holes 213 to be visible from the outside. For example, a specific number, letter or picture may be displayed by a combination of the exposed first through holes 213, so that information can be transmitted to the user.

In addition, when the light emitting member 511 is turned off and light is not emitted from the inside of the door 20, it can be difficult to see the display part 211 when viewed from the outside. For example, when the light emitting member 511 is turned off, the door 20 may have the same appearance as a door in which a configuration for displaying information such as the display part 211 is not provided.

In some implementations, the touch operation part 212 is a part where a user can input an operation command for the operation of the refrigerator 1, wherein the touch operation part 212 may be provided on a portion of the front surface of the door 20, and may be provided on the lower side of the display part 211 or at a position adjacent to the display part 211.

In some implementations, the touch operation part 212 may be defined such that a portion in which a pressing operation is detected is printed, or an operation portion is visible to the user through surface processing such as etching.

In addition, a touch sensor assembly 70 may be provided inside the door 20 disposed at a position corresponding to the touch operation part 212, and may be configured to detect a pressing operation of the touch operation part 212.

Hereinafter, an arrangement structure of the display assembly 40 and the touch sensor assembly 70 will be described in more detail with reference to the figures.

Figure 4:
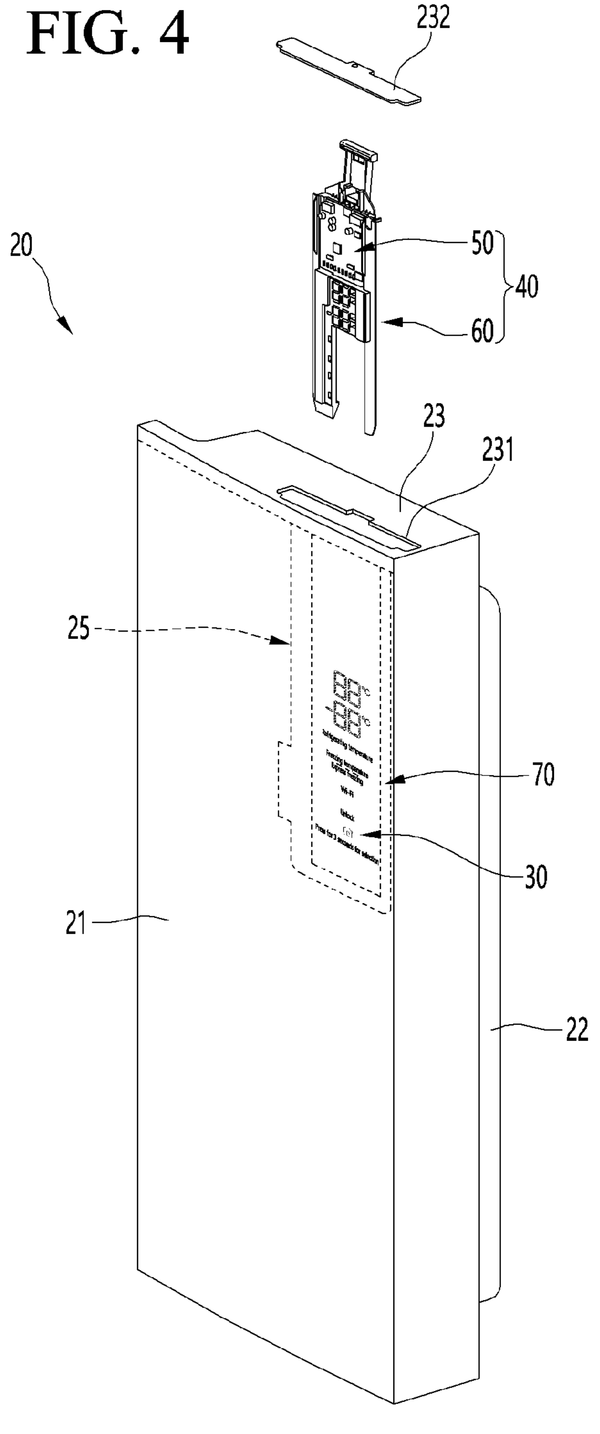
FIG. 4 is. an exploded perspective view showing an example configuration of the door from which a display assembly is separated
Figure 5:
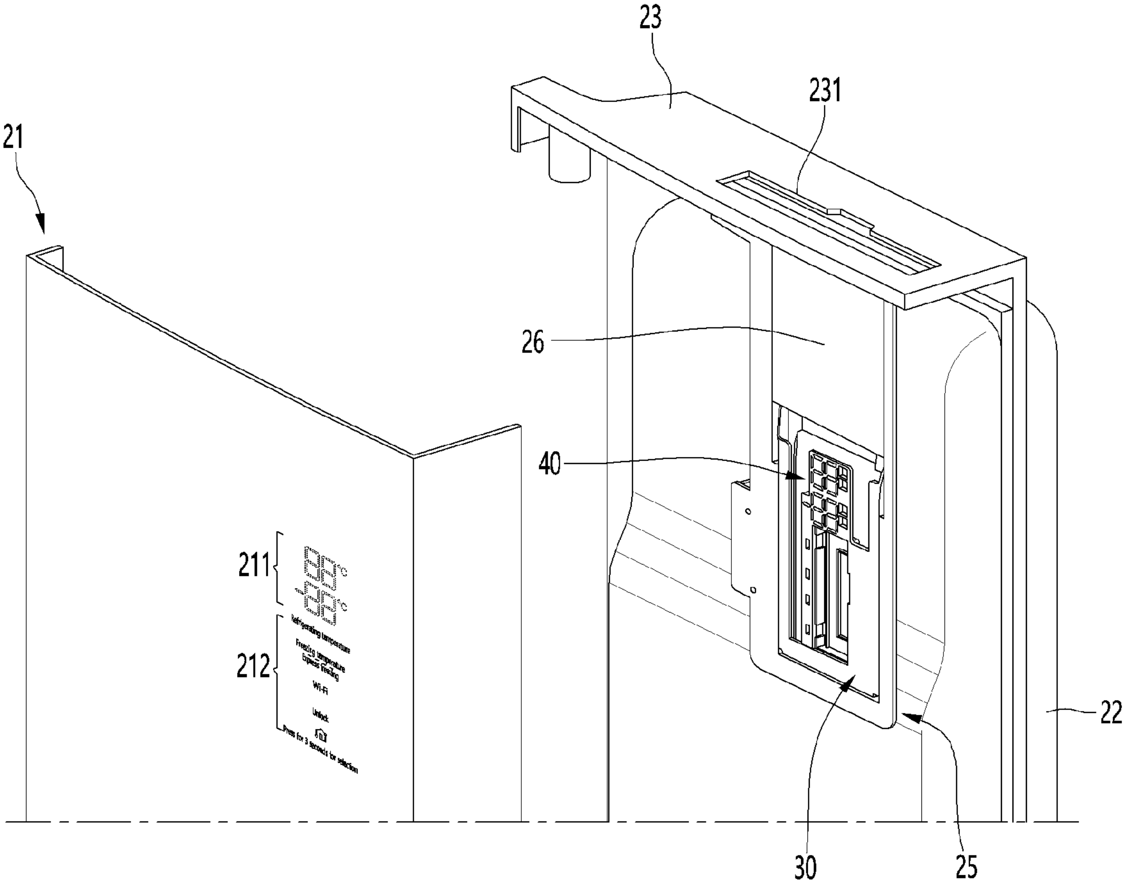
FIG. 5 is an exploded perspective view showing an example configuration of the door from which an out plate is separated.
Figure 6:
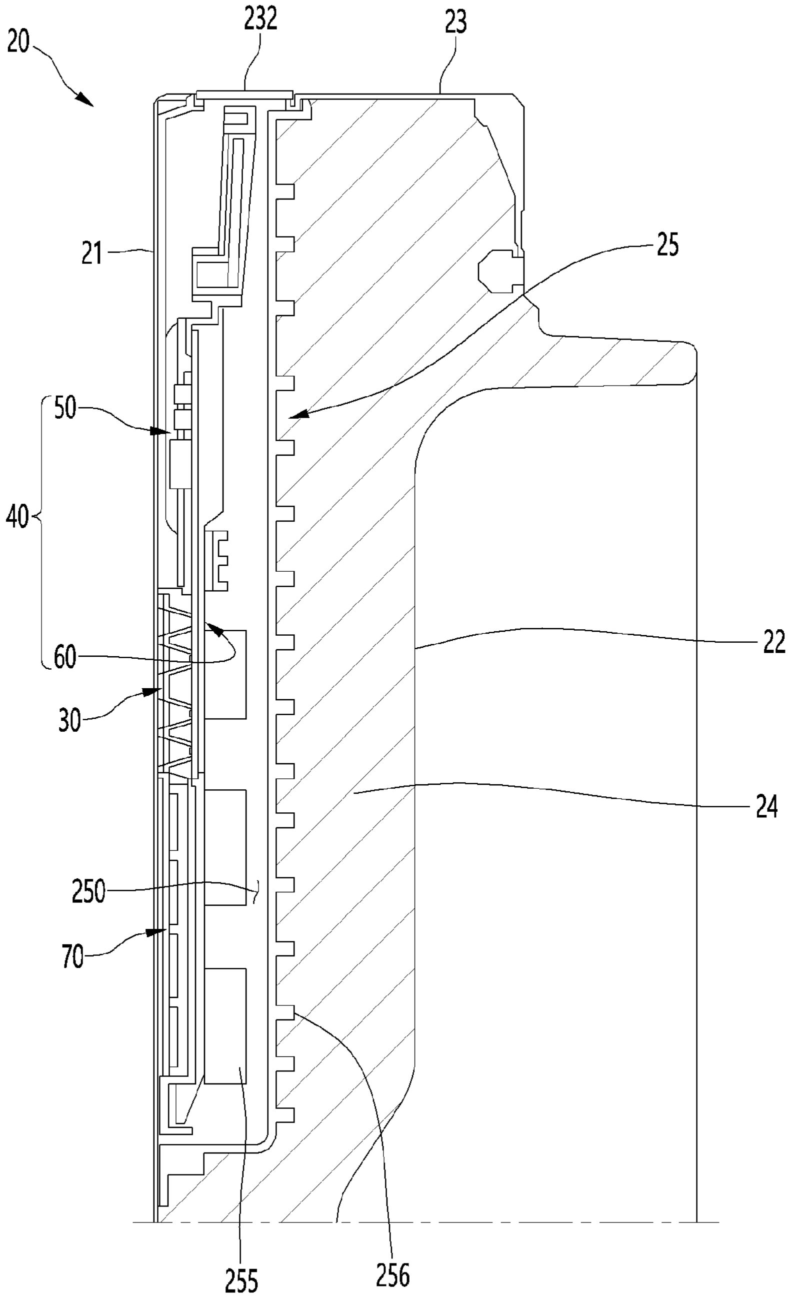
FIG. 6 is a cross-sectional view showing an example configuration of the door taken along line 6-6' of FIG. 2.

FIG. 4 is an exploded perspective view of the door from which a display assembly is separated. FIG. 5 is an exploded perspective view of the door 20 from which an out plate 21 is separated. FIG. 6 is a cross-sectional view taken along line 6-6' of FIG. 2.

As shown in the figures, the appearance of the door may be defined by the out plate 21, the door liner 22, and the cap decor 23, wherein an insulating material 24 may be provided in the inner space of the door 20. In some implementations, the door 20 can be coupled to the out plate 21, the door liner 22, and the cap decor 23, and the insulating material 24 may be provided by injecting a foaming liquid.

Meanwhile, an inner case 25 providing a space for mounting the display cover 30, the display assembly 40 and the touch sensor assembly 70 may be provided inside the door 20. The inner case 25 may have an upper end coupled to a lower surface of the cap decor 23, and a front periphery of the inner case 25 may be coupled to the out plate 21 to define a predetermined space. The space defined by the inner case 25 may define an independent space such that the foaming liquid does not penetrate the independent space when the foaming liquid is injected into the door 20, thus providing a space in which the display assembly 40 and the touch sensor assembly 70 are mounted.

In addition, a display cover 30 may be provided in the inner space of the inner case 25 to mount the display assembly 40. The display cover 30 may be provided in close contact with the rear surface of the out plate 21, and have an open upper surface, so that the display assembly 40 may be inserted downward from the top of the display cover 30.

In some implementations, a reinforcing plate 26 may be further provided between the upper end of the display cover 30 and the cap decor 23. The reinforcing plate 26 may be coupled to the rear surface of the out plate 21 to prevent the out plate 21 from being bent into the inner space of the inner case 25.

In some implementations, the open upper surface of the inner case 25 may be in communication with or otherwise be adjacent to a decor opening 231 defined in the cap decor 23. In addition, the decor opening 231 may be opened and closed by the decor cover 232. In addition, the display assembly 40 may be inserted into the inner space of the inner case 25 through the decor cover 232.

In some implementations, the upper surface of the display cover 30 can be open, and when the display assembly 40 is inserted into the inner case 25, the display assembly 40 may be inserted into the upper surface of the display cover 30 which is open. The display assembly 40 may be completely inserted into the display cover 30 by its own weight. In addition, when the decor cover 232 is mounted to shield the decor opening 231, wherein the lower surface of the decor cover 232 may press the upper end of the display assembly 40, thus enabling the display assembly 40 to be completely inserted.

In addition, the display assembly 40 may have a structure to guide the display assembly 40 to be mounted in an accurate position when being inserted into the display cover 30. For example, the display assembly 40 and the display cover 30 may have a plurality of structures that are in contact with or match each other, and through these structures, the display assembly 40 may be mounted in the correct position of the display cover 30.

In some implementations, when the display assembly 40 is mounted in the correct position inside the display cover 30, the light emitting member 511 and a third through hole 614 of the display assembly 40, a second through hole 312 of the display cover 30, and the first through hole 213 of the out plate 21 may be aligned with each other. For example, when the light emitting member 511 is turned on, the light emitted from the light emitting member 511 may pass through the third through hole 614, the second through hole 312 and the first through hole 213 in order, thus being emitted to the outside.

Figure 7:
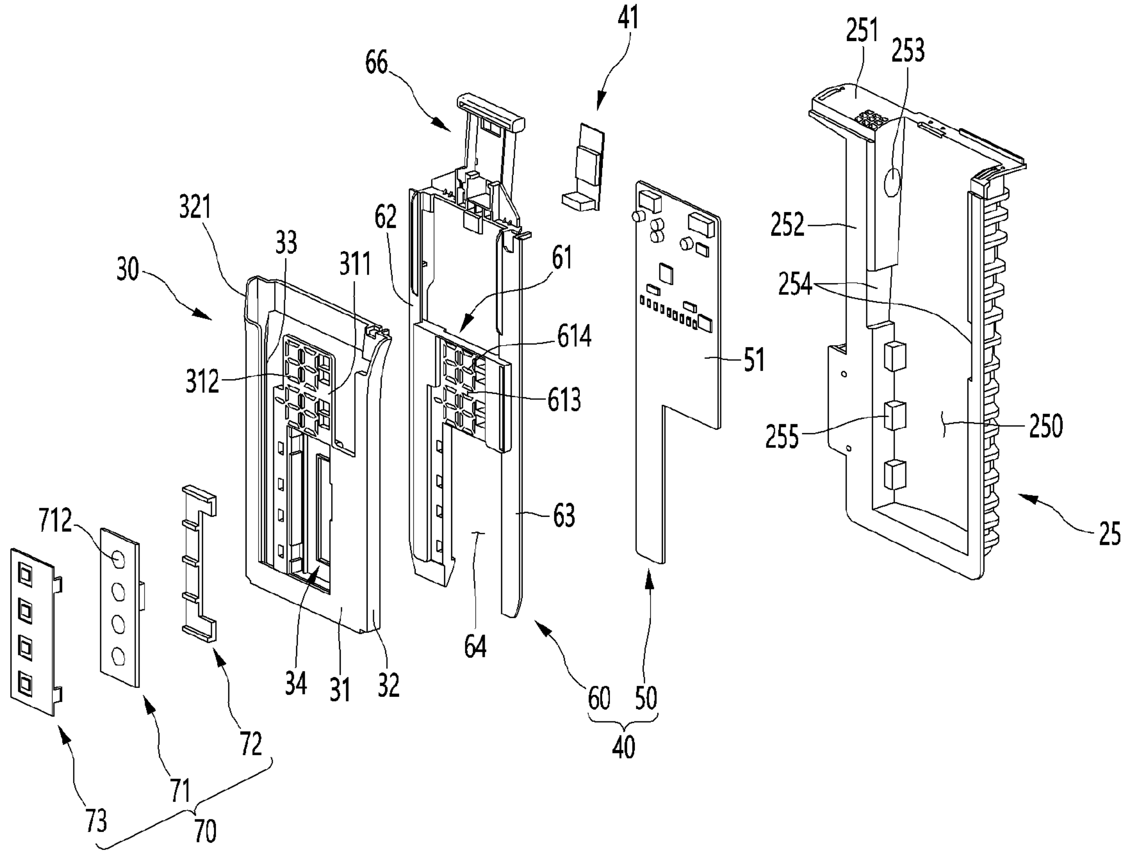
FIG. 7 is an exploded perspective view showing an example configuration of a display cover, a display assembly, a touch assembly, and an inner case which are disposed inside the door.

FIG. 7 is an exploded perspective view of a display cover, a display assembly, a touch assembly, and an inner case which are disposed inside a door.

As shown in the figure, the inner case 25 may be mounted inside the door 20, the display cover 30 may be provided in the inner area of the inner case 25, and the display assembly 40 and the touch sensor assembly 70 may be mounted in the display cover 30.

In some implementations, the inner case may be formed with a case upper surface 251 and a case front surface 252, and define a space 250 that is open forward and upward. The case upper surface 251 may be in contact with the cap decor 23, and the case front surface 252 may be in contact with the rear surface of the out plate 21. In addition, the case front surface 252 may be disposed along the rest of the periphery of the inner case 25 except the upper end of the space 250 of the inner case 25.

Further, in some implementations, a reinforcing rib 256 may be disposed on the rear surface of the inner case 25 entirely, so that the inner case 25 is not deformed by pressure when the heat insulating material 24 is formed. A wire hole 253 may be disposed on a side of the upper portion of the inner case 25, wherein wires connected to the display assembly 40 and the touch sensor assembly 70 provided in the inner case 25 are allowed to pass through.

In addition, cover support portions 255 protruding inward may be formed on both left and right sides of the space of the inner case 25. The cover support portions 255 may support the display cover 30 from the rear to enable the display cover 30 to be in close contact with the rear surface of the out plate 21.

Further, in some implementations, a case groove 254 recessed laterally may be formed on the upper side of the cover support portions 255. The case groove 254 may provide a space in which an upper guide 321 at an upper end of the display cover 30 is accommodated.

In some implementations, the display cover 30 may be provided inside the inner case 25. The cover front surface 31 of the display cover 30 may be in close contact with the rear surface of the out plate 21. Further, a cover rear surface 33 spaced apart from the cover front surface 31 may be formed, and a space in which the display assembly 40 is accommodated may be defined by a cover peripheral surface 32 connecting the cover front surface 31 and the cover rear surface 33.

In addition, a cover light guide 311 in which a plurality of second through holes 312 are formed may be disposed in the display cover 30. In addition, a sensor assembly mounting portion 34 on which the touch sensor assembly 70 is mounted may be formed to be recessed from the cover front surface 31.

In some implementations, the display assembly 40 may include a display printed circuit board (PCB) 50 to which the light emitting member 511 or the like is mounted, and a display frame 60 in which the display PCB 50 is mounted, wherein the display assembly 40 can be inserted through the decor opening 231 from the outside of the door 20.

In addition, the display frame 60 may include a handle portion 66, a first side extension portion 62 and a second side extension portion 63 extending while being spaced apart from each other on the left and right sides, and a frame light guide 61 connecting the first side extension portion 62 and the second side extension 63. The frame light guide 61 may have a third through hole 614 aligned with the second through hole 312. In addition, a WiFi module 41 may be mounted in the handle portion 66.

In some implementations, the touch sensor assembly 70 may include a touch PCB 71 in which a touch sensor 712 is mounted, an elastic member 72 which supports the touch PCB 71, and a touch cover 73 which shields the touch PCB 71. The elastic member 72, the touch PCB 71, and the touch cover 73 may be sequentially mounted on the sensor assembly mounting portion 34.

Hereinafter, the display part 211 visualized by the operation of the display assembly 40 will be described with reference to the figures.

Figure 8:
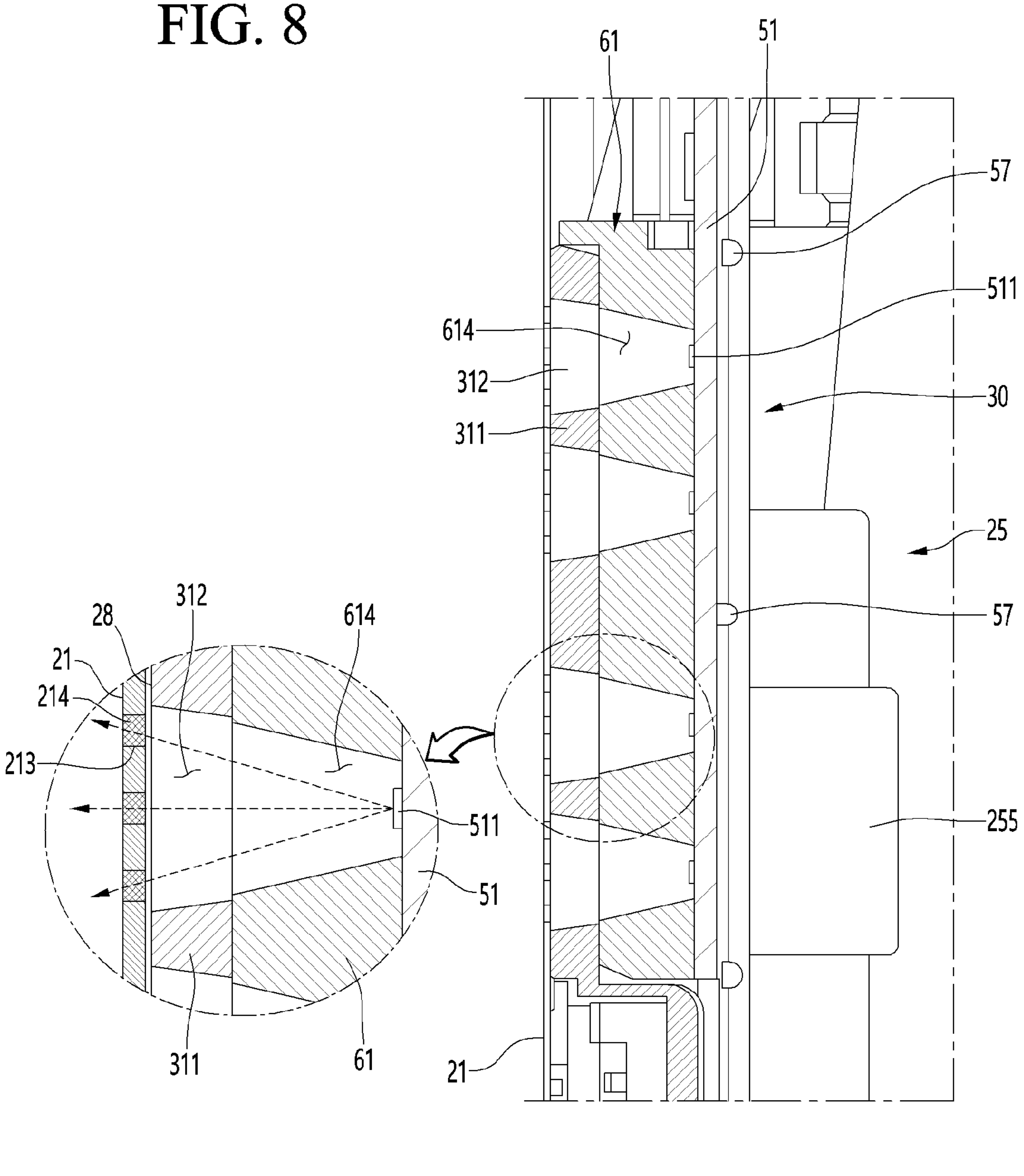
FIG. 8 is a cross-sectional view showing an example configuration of the door taken along line 8-8' of FIG. 2.

FIG. 8 is a cross-sectional view taken along line 8-8' of FIG. 2.

As shown in the figures, when a user's touch operation is induced during operation of the refrigerator 1 or when the operation state of the refrigerator 1 is displayed, the light emitting member 511 can be turned on, and the display part 211 may be visualized while light is emitted. In addition, the display part 211 may display a specific number, letter, symbol, or pattern by means of a plurality of first through holes 213 to transmit information to a user.

In some implementations, when the light emitting member 511 is turned on, light emitted by the light emitting member 511 may be emitted to the outside by passing through the third through holes 614, the second through holes 312 and the first through holes 213 sequentially, wherein the display assembly 40 and the display cover 30 are coupled to be aligned.

Further, in some implementations, the display PCB 50 in which the light emitting member 511 is provided may be accommodated in the display frame 60 and coupled to the display frame, so that light from the light emitting member 511 passes through the third through holes 614.

In addition, the display cover 30 may be coupled to the out plate 21 such that the plurality of first through holes 213 are aligned with the second through holes 312. Accordingly, the light passing through the second through holes 312 may pass through the first through holes 213 and the light may be emitted to the outside.

In some implementations, a diffusion sheet 28 is further provided between the display cover 30 and the out plate 21 so that the light passing through the first through hole 213 becomes brighter, thus enabling the first through hole 213 to look sharper and brighter. In addition, a transparent hole-filling member 214 may be provided inside the first through hole 213, and emitted light may pass through the hole-filling member 214 and be emitted to the outside.

In some implementations, in the process of inserting the display assembly 40 into the inside of the display cover 30, when the display frame 60 and the display cover 30 are inserted in the vertical direction, the display frame 60 and the display cover 30 may be coupled to each other and disposed on the same plane, and the display cover 30 and the display assembly 40 may be coupled in an aligned state.

Therefore, all of light passing through the third through holes 614 may be guided to the second through holes 312, and then guided to the first through holes 213 without being diffused.

Hereinafter, a method of manufacturing the out plate 21 in which the first through hole 213 and the hole-filling member 214 are formed in the out plate 21 will be described with reference to the figures. For convenience of description and understanding, directions will be defined. When the out plate 21 is placed on a surface, a direction corresponding to the front surface of the refrigerator may be referred to as an upper surface or an upward direction, and the opposite direction thereto may be referred to as a lower surface or a downward direction.

Figure 9:
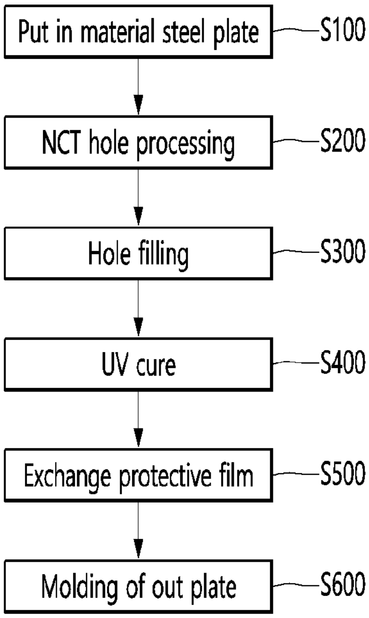
FIG. 9 is a flowchart sequentially showing an exemplary method of manufacturing an out plate.

FIG. 9 is a flowchart sequentially showing a method of manufacturing an out plate.

As shown in the figure, in order to manufacture the out plate 21, first, a material steel plate 100 may be prepared for processing. The material steel plate 100 may be molded into the shape of the out plate 21, and the hole-filling member 214 is provided in the material steel plate 100. Further, the material steel plate 100 may be processed to be assembled with the door 20.

In some implementations, the material steel plate 100 may be supplied in a state of being cut into a sheet shape, wherein the sheet is in a roll state. Since the material steel plate 100 may be processed through repetitive horizontal movement in order to form the first through holes 213, the material steel plate 100 may necessarily be supplied in a state of being cut into a sheet shape. For example, the material steel plate 100 may be cut into the same size as the out plate 21 before sheet metal processing.

Figure 22:
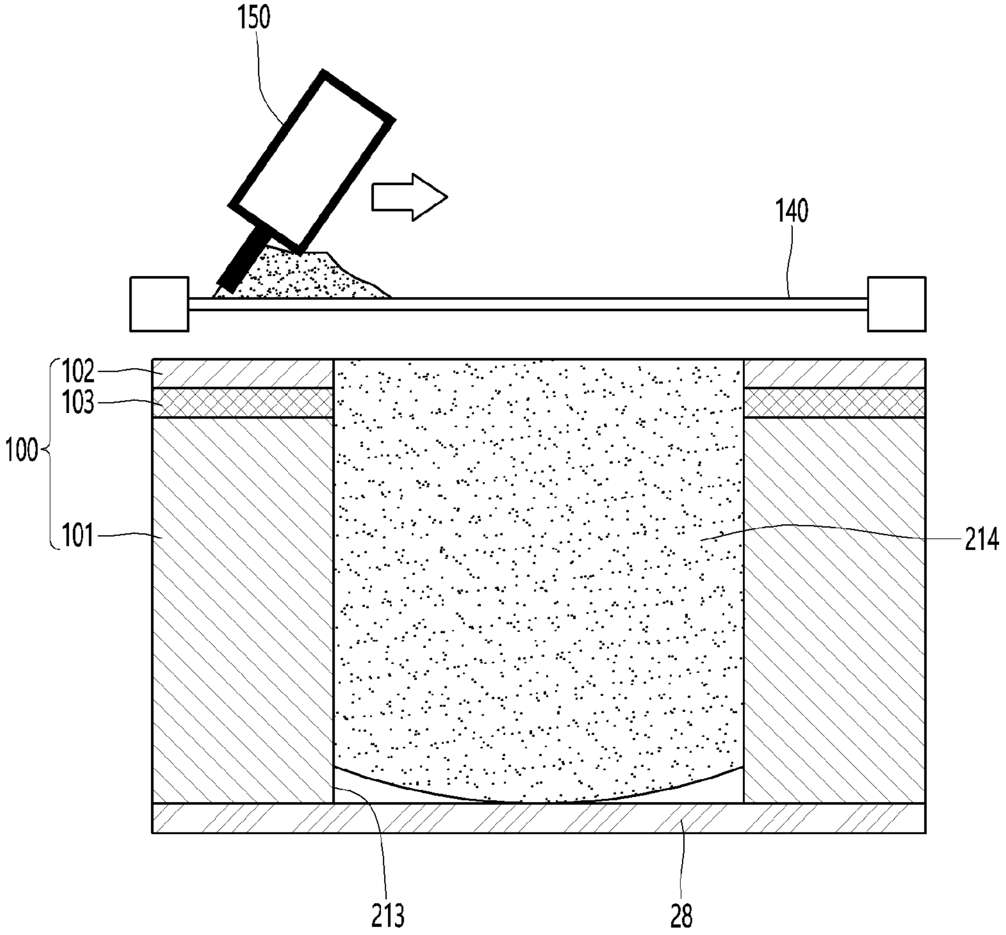
FIG. 22 is a cross-sectional view showing an example configuration of a process of filling a through hole with a hole-filling member.

The material steel plate 100 may include a steel plate 101 and a first protective film 102 attached to the front surface of the steel plate 101. In some implementations, the steel plate 101 may be made of a stainless steel plate or a PCM (Pre-coated Metal) or VCM (Vinyl Coated Metal) steel plate which may be used in the refrigerator 1 or a home appliance. In addition, the material steel plate 100 may further include an exterior layer 103 formed on the front surface of the steel plate 101 as shown in FIG. 22, and the first protective film 102 may be attached onto the front surface of the exterior layer 103.

The first protective film 102 may prevent damage to the surface of the steel plate 101 during transport and storage of the steel plate 101, and may be kept attached to the steel plate 101 when the material steel plate 100 is assembled. The first protective film 102 may be formed to a thickness of about 60 μm or less, and may protect the surface of the steel plate 101 as well as function as a mask when forming the hole-filling member 214. In some implementations, the material steel plate 100 may be processed with the first protective film 102 attached thereto. In this case, the material steel plate 100 may be disposed such that the first protective film 102 faces upward.

The first protective film 102 may be made of a variety of materials. In some implementations, in step S100, the first protective film 102 may be made of polyethylene terephthalate (PET) material, wherein the first protective film 102 is punched together with the steel plate 101 by the punch 110 when the first through hole 213 is formed.

In some implementations, the first through hole 213 may be formed in the material steel plate 100 by a hole processing device. The hole processing device may use a NCT (Numerical Control Turret Punch Press) device. The NCT device may include a punch 110, a stripper 120, and a die 130 which are designed to form the first through hole 213. In addition, the configurations including the punch 110, the stripper 120, and the die 130 may be referred to as an out-plate manufacturing apparatus 2 (hereinafter referred to as "manufacturing apparatus 2").

The material steel plate 100 may be seated on the die 130, and when the material steel plate 100 is moved to a set position on the die, the punch 110 and the stripper 120, which are positioned above the die 130, are moved up and down to form one first through hole 213. In addition, the material steel plate 100 is moved by a set distance to form the next first through hole 213, wherein all the first through holes 213 included in the display part 211 are formed by repeatedly performing the above process.

In some implementations, the punch 110 and the stripper 120 form the first through holes 213 while being moved up and down at a high speed while their positions are being fixed, and the die 130 is maintained in a fixed state. Therefore, the material steel plate 100 is rapidly moved horizontally while changing its position so that the through holes 213 are formed.

The material steel plate 100 may maintain a state in which the first protective film 102 is attached thereto, and thus the punch 110 penetrates the first protective film 102 and the steel plate 101 at once to form the first through holes 213. Accordingly, even when the first through holes 213 are formed, the first protective film 102 remains attached to the front surface of the steel plate 101.

In some implementations, the first through holes 213 may be formed into a fine size having a diameter of approximately 0.4 mm to 0.7 mm. In addition, tens to hundreds of first through holes 213 may be formed in one material steel plate 100 to form the display part 211, and a plurality of first through holes 213 may be formed in a dense form within a predetermined region in order to form numbers, letters, symbols, or the like. Accordingly, in order to continuously form a plurality of the first through holes 213, the material steel plate 100 is repeatedly moved along the upper surface of the die 130, and in this process, all burrs, formed at the rear ends of the first through holes 213 when the through holes 213 are formed by the punch 110, may be removed.

That is, the out plate 21 having the first through holes 213 with a smooth periphery at the rear surface thereof may be manufactured by forming the through holes 213 by the manufacturing apparatus 2, without performing a separate post-processing. The process of forming of the first through holes 213 and removing the burrs of the first through holes 213, as shown in step S200, will be described again below together with a detailed description of the manufacturing apparatus 2.

In some implementations, the material steel plate 100 in which the first through holes 213 are formed may be transferred and a process of forming the hole-filling member 214 in the first through holes 213 is performed. For example, in a state in which the diffusion sheet 28 is attached to the rear surface of the material steel plate 100, a liquid hole-filling material can be filled in the first through holes 213 from the front surface of the material steel plate 100.

For example, the hole-filling material may be made of an ultraviolet curable resin material (UV ink) such as polyurethane acrylate, and may fill the interiors of the plurality of first through holes 213 by using a silkscreen printing method. In some implementations, the first protective film 102 attached to the front surface of the steel plate 101 can cover the entire front surface of the steel plate 101 except for the first through holes 213, wherein the first protective film 102 may function as a mask. Since the hole-filling material may be filled by the silkscreen printing method, the hole-filling material may be referred to as ink or UV ink.

In some implementations, as shown in step S300, the first through holes 213 may be filled with the hole-filling material by using the diffusion sheet 28 that is already attached and the first protective film 102, without forming an additional mask for the formation of the hole-filling member 214 or adding a separate configuration for blocking the hole-filling material on the rear surface of the steel plate 101

In some implementations, after the hole-filling material is filled in the first through holes 213, the hole-filling material can be cured. In order to effectively cure the hole-filling material, the material steel plate 100 can be irradiated with ultraviolet rays to dry the hole-filling material. When the hole-filling material is completely dried and cured, the hole-filling member 214 is provided in the first through holes 213 to completely fill the first through holes 213. In some implementations, as shown in step S400, the hole-filling member 214 may be formed to be transparent or semi-transparent to allow light to pass through.

In some implementations, when the hole-filling member 214 is completely cured, the first protective film 102 can be removed. In addition, the touch operation part 212 may be disposed on the front surface of the steel plate 101. For example, the touch operation part 212 can be disposed on the front surface of the steel plate 101 corresponding to the position of the touch sensor 712 so that the user can recognize a position of the touch operation part 212.

Therefore, the touch operation part 212 may be disposed on the surface of the steel plate 101 from which the first protective film 102 has been removed. In some implementations, the touch operation part 212 may be formed by printing, or by processing the surface of the steel plate 101.

After disposing the touch operation part 212 on the front surface of the steel plate 101, the second protective film 104 can be attached to the front surface of the steel plate. The second protective film 104 may be attached to cover the entire front surface of the steel plate 101 including the hole-filling member 214.

In some implementations, with the attachment of the second protective film 104, the material steel plate 100 may be transported and stored in a state where a plurality of steel plates 101 are loaded on top of each other, and it is possible to prevent the surface of the steel plate 101 from being damaged or the hole-filling member 214 from peeling off.

The second protective film 104 may be made of a variety of materials capable of protecting the entire surface of the steel plate 101, as shown in step S500. For example, when a pattern or coating is provided on the surface of the steel plate 101, the second protective film 104 may be made of a material with excellent adhesiveness.

In some implementations, the material steel plate 100 to which the second protective film 104 is attached may be transferred for processing of a final shape. In addition, the material steel plate 100 which has been transferred may be processed into a shape for assembly with the door 20. That is, the material steel plate 100 may be processed into a shape capable of being assembled with the door 20 by sheet metal processing.

In addition, the second protective film 104 attached to the surface of the steel plate 101 may be removed after the material steel plate 100 is assembled with the door 20. Accordingly, as shown in step S600, the steel plate 101 from which the second protective film 104 has been removed may be defined as the out plate 21. In addition, the out plate 21 can be assembled with the door 20 to form a front surface of the door 20. In some implementations, the second protective film 104 may be removed when the refrigerator 1 is installed after the material steel plate 100 is assembled to constitute the door 20.

Hereinafter, a process of forming the first through holes 213 in the out plate 21 manufactured by the manufacturing method as described above and a manufacturing apparatus for forming the first through holes 213 are described in more detail with reference to the figures.

Figure 10:
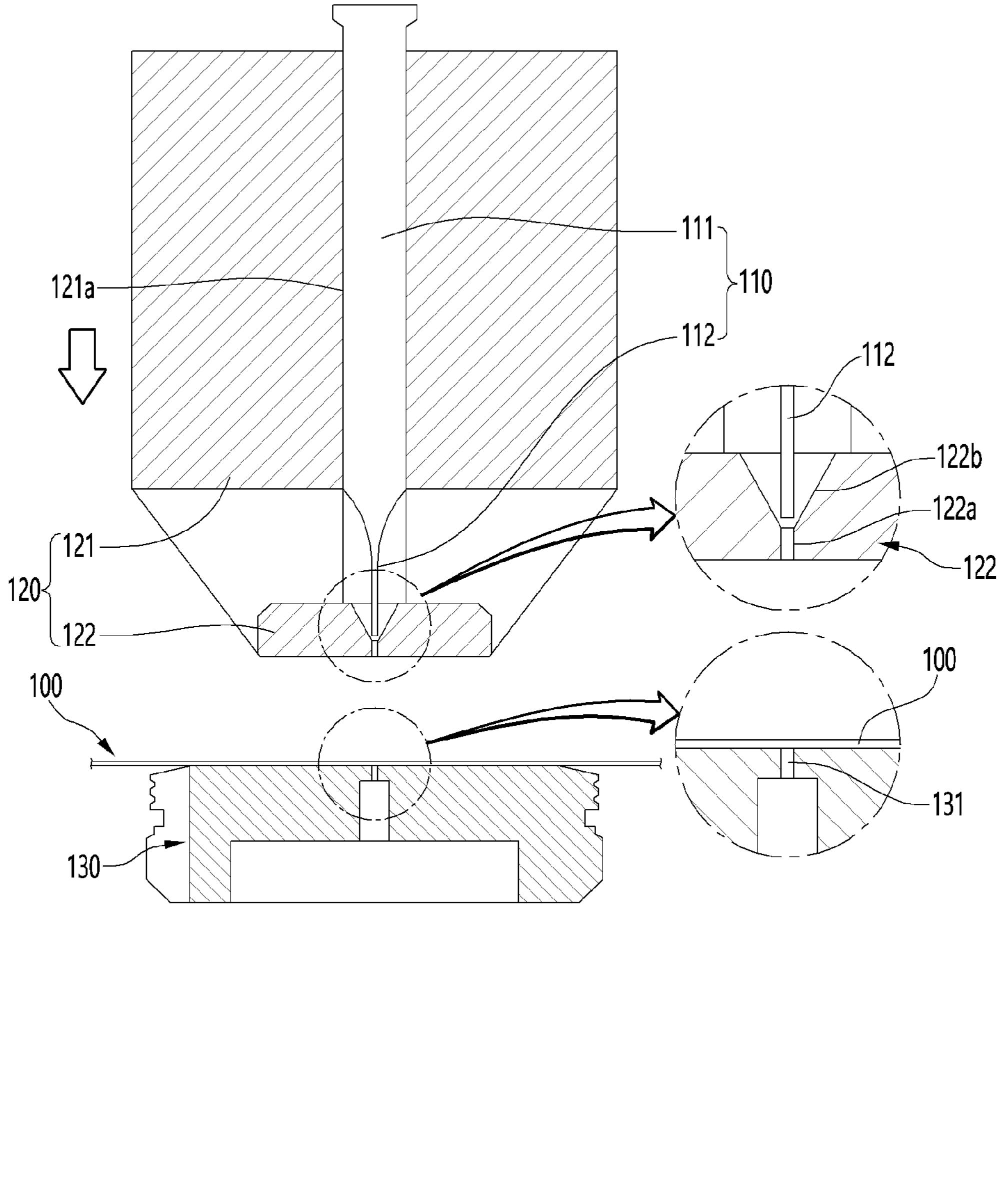
FIG. 10 is a view showing an example configuration of an out plate manufacturing apparatus, wherein a punch is lifted.
Figure 11:
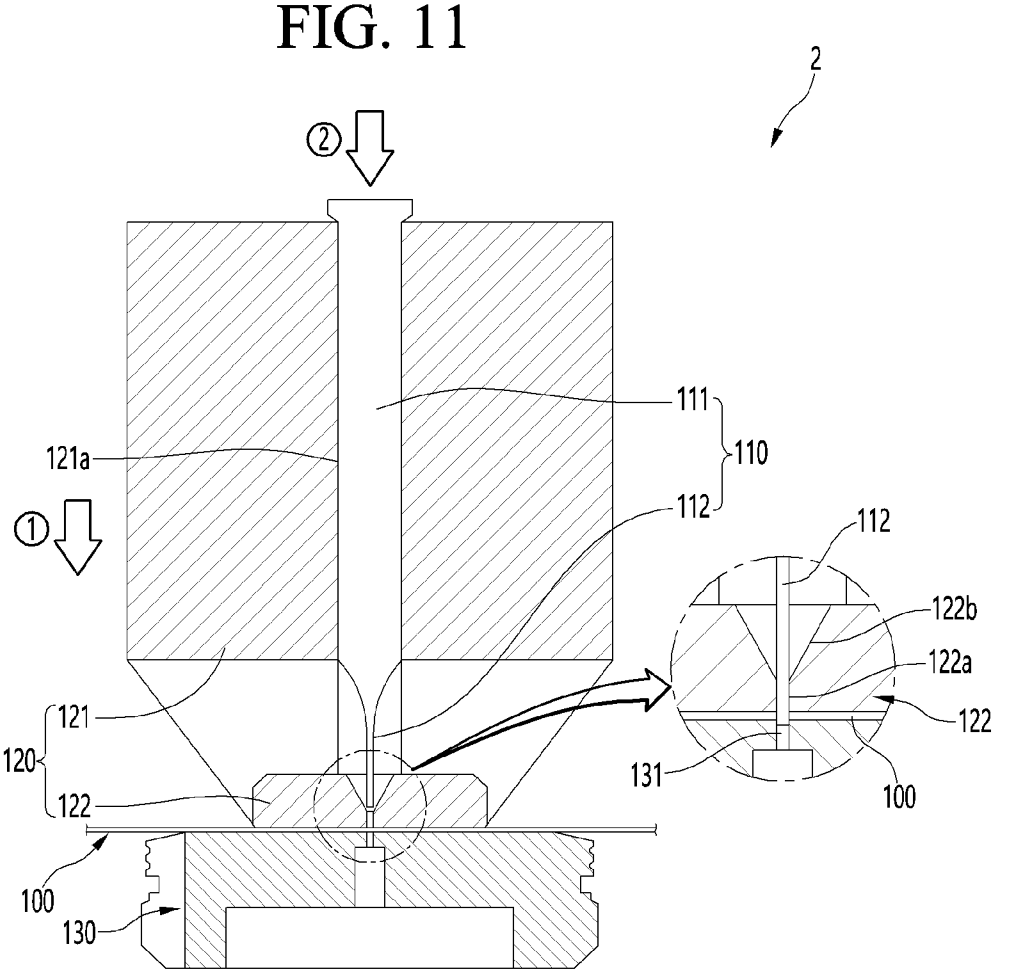
FIG. 11 is a view showing an example configuration of the out plate manufacturing apparatus, wherein the punch is lowered.
Figure 12:
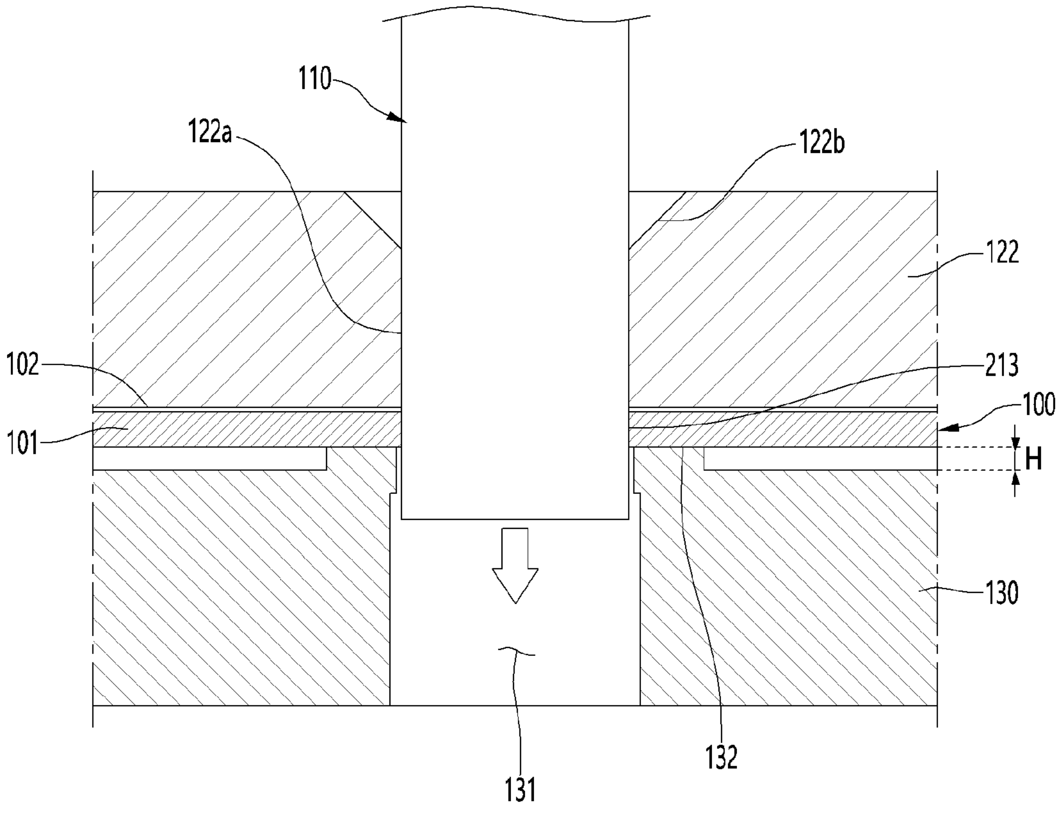
FIG. 12 is an enlarged view showing an example configuration of the out plate manufacturing apparatus, wherein a through hole is formed in such a way that the punch passes through the out plate manufacturing apparatus.
Figure 13:
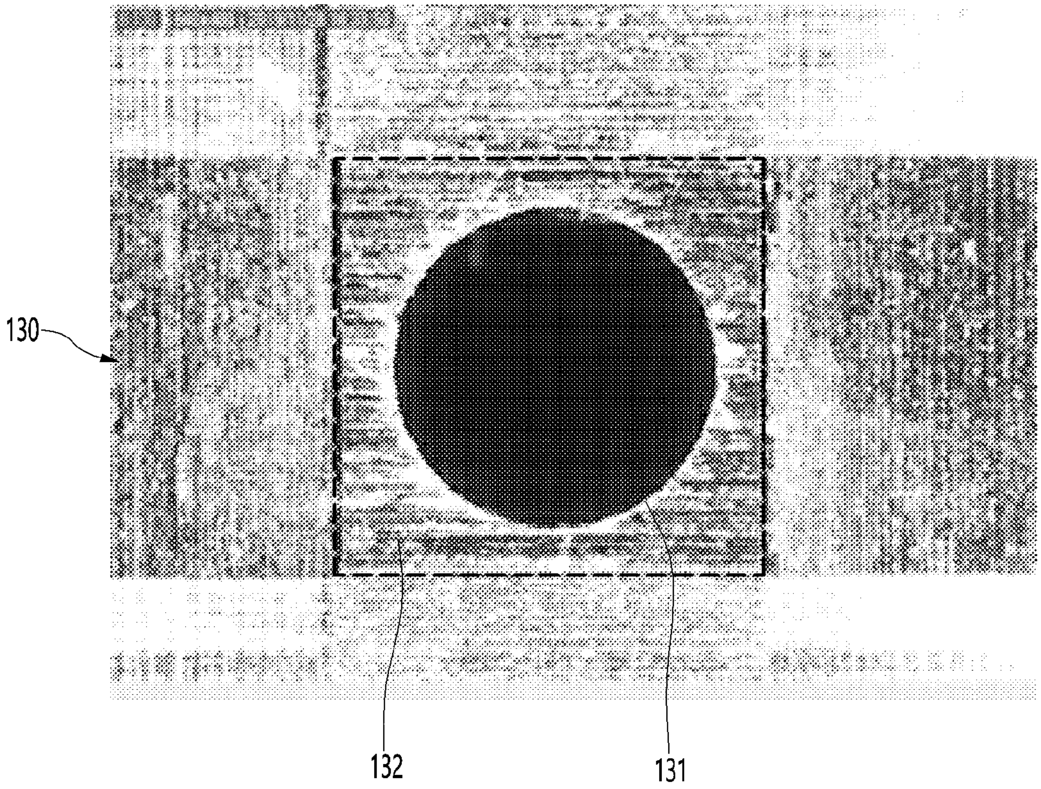
FIG. 13 is a photograph of a die of an out plate manufacturing apparatus taken from above.
Figure 14:
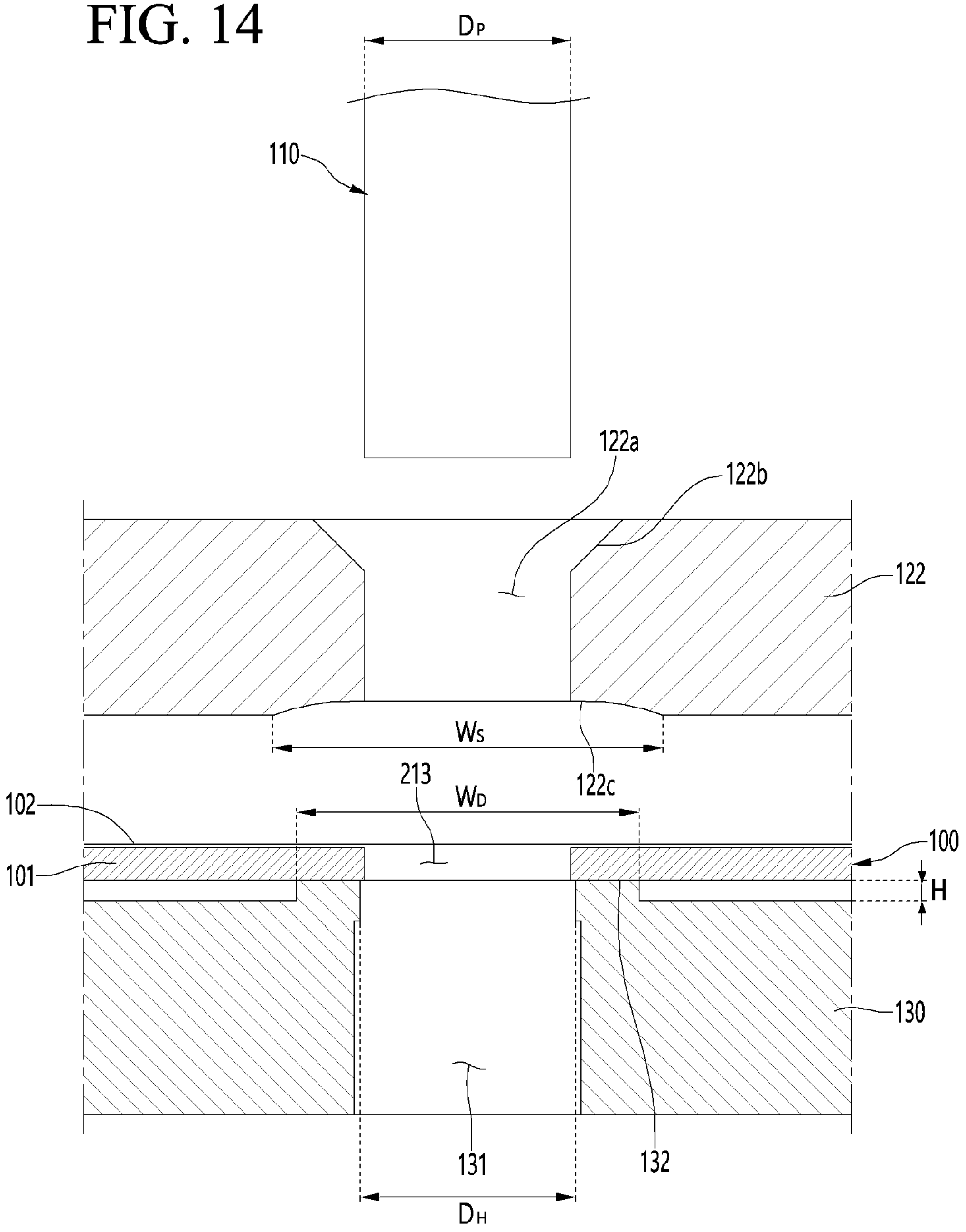
FIG. 14 is a view showing an example configuration of a stripper of the out plate manufacturing apparatus.
Figure 15:
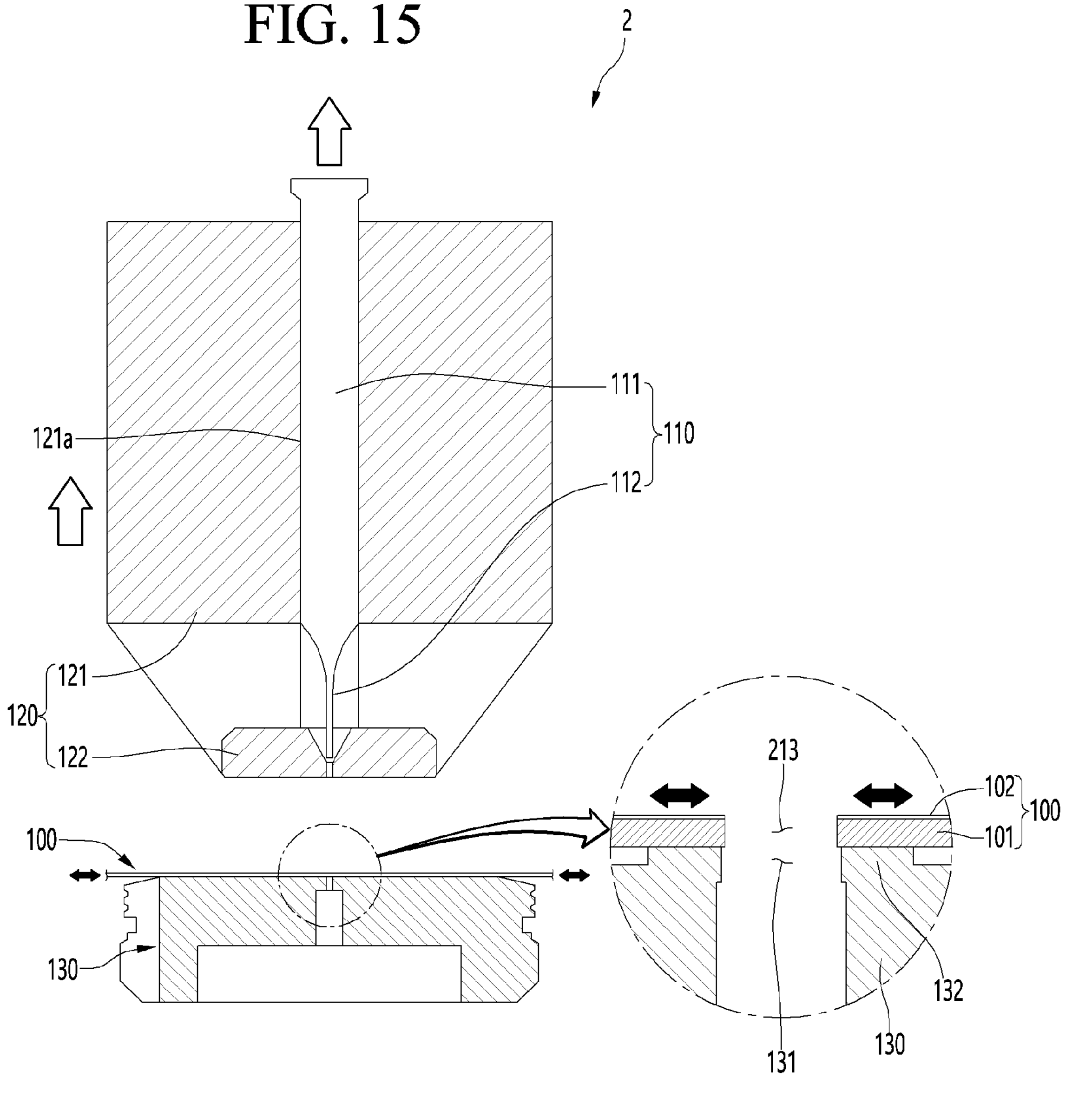
FIG. 15 is a view showing an example configuration of a movement state of the out plate manufacturing apparatus after forming the through hole.

FIG. 10 is a view showing a state in which a punch of an apparatus for manufacturing an out plate is lifted. FIG. 11 is a view showing a state in which the punch is lowered. In addition, FIG. 12 is an enlarged view showing a state in which a through hole is formed in such a way that the punch passes through the out-plate manufacturing apparatus. FIG. 13 is a photograph of a die of an out-plate manufacturing apparatus taken from above. FIG. 14 is a view showing an example of a stripper of the out plate manufacturing apparatus. FIG. 15 is a view showing a movement state after forming the through hole.

As shown in the figures, the manufacturing apparatus 2 may be configured by an NCT apparatus in which the punch 110 is able to be vertically moved and the movement of the material steel plate 100 may be controlled in terms of a distance. In particular, the punch 110, the stripper 120, and the die 130 may be included in order to form the first through holes 213 having a fine size.

In some implementations, other configurations of the manufacturing apparatus 2 can be the same as those of a general NCT apparatus. The punch 110, the stripper 120 and the die 130 of the manufacturing apparatus 2 will be described below. In particular, the punch 110, the stripper 120, and the die 130 can be configured to form the first through holes 213 having a fine size unlike a general structure.

In some implementations, the punch 110 can penetrate the material steel plate 100 to form the first through holes 213, and move in the vertical direction with the guide of the stripper 120. The punch 110 may be formed of a material having a high hardness so as to penetrate the material steel plate 100 and not be deformed or damaged even in repeated use. For example, the punch 110 may be made of a cemented carbide material.

In some implementations, the punch 110 may be formed in a shape such as a bar extending in the vertical direction. In some implementations, the punch 110 may include a head part 111 and a cutting edge part 112.

In detail, the head part 111 may form a main portion of the punch 110 and may be inserted into the stripper 120 and positioned to be movable in the vertical direction. The head part 111 may have a relatively larger cross-sectional area, and may elongate in the vertical direction.

In addition, the cutting edge part 112 can be a part that substantially penetrates the material steel plate 100 such that the first through holes 213 are formed. The cutting edge part 112 may extend downward from the lower end of the head part 111 and may be formed to have an outer diameter equal to the diameter of the first through hole 213. For example, the diameter of the cutting edge part 112 may be formed to be 0.4 mm~0.7 mm. The cutting edge part 112 may extend from the top to the bottom with the same diameter.

In some implementations, the lower end of the head part 111 at which the cutting edge part 112 is formed may be formed to be inclined or rounded, and may be formed to have a smaller cross-sectional area as it extends downward. The cutting edge part 112 and the head part 111 may be formed to be concentric, and the head part 111 is guided to move up and down inside the stripper 120 to stably penetrate the material steel plate 100.

The stripper 120 may be configured to guide the movement of the punch 110 and press and fix the material steel plate 100 from above. The stripper 120 may be moved together in association with the vertical movement of the punch 110. In detail, in order to form the first through holes 213, the stripper 120 can be first moved to a position in contact with the material steel plate 100, and then the punch 110 can be guided by the stripper 120 and further moved downward, so that the cutting edge part 112 passes through the material steel plate 100 to form the first through holes 213.

In some implementations, the stripper 120 may be configured in multiple stages so as to guide the vertical movement of the punch 110, and to penetrate the material steel plate 100 while the cutting edge part 112 is maintained at an accurate position. In detail, the stripper 120 may include a stripper body 121 that guides the head part 111 and a stripper plate 122 that guides the cutting edge part 112.

The stripper body 121 may form most of the shape of the stripper 120, and may be formed to correspond to the length of the head part 111. In addition, a body guide portion **121*a* may be formed at the center of the stripper body 121. The body guide portion 121*a* may be formed to pass through the center of the stripper body 121 in the vertical direction, and may be formed to have an inner diameter equal to the diameter of the head part 111. Accordingly, the head part 111 is accommodated inside the stripper body 121 and may be guided in a vertical direction along the body guide portion 121*a***.

For example, the length of the head part 111 may form most of the entire length of the punch 110, and therefore, when the punch 110 is moved up and down, the punch 110 can be maintained at a predetermined position without moving in a front-rear direction and a left-right direction.

In some implementations, the stripper plate 122 may be provided at the lower end of the stripper 120 and may be provided under the stripper body 121. The stripper plate 122 may be disposed to be spaced apart and below from the lower end of the stripper body 121, and may be positioned at a position corresponding to the cutting edge part 112.

In addition, a plate guide portion **122*a* through which the cutting edge part 112 passes through may be formed at the center of the stripper plate 122. The plate guide portion 122*a* may vertically pass through the center of the stripper plate 122 and the cutting edge part 112 may be accommodated therein. In this case, the inner diameter of the plate guide portion 122***a* can be formed to correspond to the diameter of the cutting edge part 112 to prevent the movement of the cutting edge part 112 when the punch 110 is moved up and down, thus making it possible to form the through holes 213 at exact positions.

In addition, an inclined portion 122*b* may be formed at an upper end of the plate guide portion 122*a*. The inclined portion 122*b* may guide the cutting edge part 112 to be directed toward the center of the plate guide portion 122*a* in the process in which the cutting edge part 112 is moved downward, and may be formed such that a width of the inclined portion 122*b* becomes narrower as it goes downward from the upper end to the lower end of the plate guide portion 122*a*.

In detail, the punch 110 can be positioned inside the stripper 120 before the lowering of the punch 110 is started as shown in FIG. 10, and in particular, the lower end of the cutting edge part 112 can be positioned inside the plate guide portion 122*a*, but may be located in the area of the inclined portion 122*b* or above the lower end of the inclined portion 122*b*. Therefore, while the punch 110 is lowered, the cutting edge part 112 may be directed toward the center of the inside of the plate guide portion 122*a*, thus making it possible to form the through hole 213 at an exact position.

As shown in FIGS. 11 and 12, when the punch 110 has been completely lowered, the lower end of the cutting edge part 112 may penetrate the material steel plate 100, that is, subsequently the first protective film 102 and the steel plate 101 after passing through the lower end of the stripper 120 to form the first through hole 213.

In detail, while the material steel plate 100 can be seated on the die 130, the lower surface of the material steel plate 100 may be supported by the die 130, and the upper surface of the material steel plate 100 is fixed in a state of being pressed by the stripper 120 (① in FIG. 11). In this state, as the punch 110 is further lowered, the cutting edge part 112 may penetrate the material steel plate 100 (② in FIG. 11).

In some implementations, the die 130 may be maintained in a fixed state, and the material steel plate 100 may be positioned on the upper surface of the die 130. The position of the material steel plate 100 may be moved to a position set by the manufacturing apparatus 2. For example, the material steel plate 100 may be moved in a state of being seated on a bed of the manufacturing apparatus 2, and at this time, may be horizontally moved while in contact with the upper surface of the die 130.

A die hole 131 may be formed in the die 130. The die hole 131 may be formed at a position facing the lower end of the punch 110 and may be formed in an upper surface of the die 130. In addition, the die hole 131 may be formed by passing through the center of the die 130.

In some implementations, when the punch 110 is moved downward to form the first through hole 213 in the material steel plate 100, the lower end of the cutting edge part 112 may be inserted into the die hole 131. In some implementations, the inner diameter Dh of the die hole 131 may be slightly larger than the outer diameter Dp of the cutting edge part 112 of the punch 110, and a set tolerance may be maintained.

For example, the tolerance may be set to 10% of the thickness of the steel plate 101. When the thickness of the steel plate 101 is 0.5 mm, the tolerance may be 0.05 mm. When the tolerance is too small, there may be a problem that it is difficult to smoothly move the cutting edge part 112 up and down. In particular, the continuous formation of the first through holes 213 may be possible through appropriate management of the tolerance according to the characteristic of the punch 110 that is repeatedly moved vertically and at high speed. On the other hand, when the tolerance is too large, there may be a problem that the sizes of the first through holes 213 are not uniform. The steel plate 101 may have a thickness of approximately 0.3 mm to 0.7 mm so as to form the exterior of the door 20, and the inner diameter Dh of the die hole 131 may be determined by considering the thickness and tolerance of the material steel plate 100.

In some implementations, the lower portion of the die hole 131 may be formed to have a larger inner diameter than the upper end of the die hole 131. Accordingly, a piece of the material steel plate 100 generated when the first through hole 213 is formed may be discharged downward.

In addition, a die protrusion 132 may be formed on an upper surface of the die hole 131. The die protrusion 132 may be formed along the periphery of the through hole 213 and, as shown in FIG. 13, may be formed in a square shape that is concentric with the through hole 213.

When the material steel plate 100 having a thin thickness is processed using the punch 110, the die protrusion 132 may prevent the periphery of the through hole 213 from being pressed downward and deformed. Since the out plate 21 can be made of a metal material and it can be easily visible even when a fine bend occurs, the deformation of the material steel plate 100 itself may be minimized even when the first through hole 213 is formed.

In particular, deformation of the material steel plate 100 may become inevitable in the process of forming the first through holes 213 in the dense form. Accordingly, the die protrusion 132 may protrude around the first through hole 213 and may protrude by a set height "H" based on the upper surface of the die hole 131. The upper surface of the die protrusion 132 is formed in a planar shape parallel to the upper surface of the die 130 to support the material steel plate 100 from below.

In some implementations, the die protrusion 132 has a structure protruding upward from the periphery of the first through hole 213. For example, the set height "H" may be approximately 3 μm to 10 μm. When the die protrusion 132 is too high, the material steel plate 100 may be pressed by the periphery of the die protrusion 132, and when the die protrusion 132 is too low, compensation for deformation of the periphery of the first through hole 213 is not effectively made.

In some implementations, when the punch 110 passes through the material steel plate 100 to form the first through hole 213, the die protrusion 132 may slightly push an area of the periphery of the first through hole 213 in the material steel plate 100 corresponding to the die protrusion 132 upward, thus offsetting the material steel plate 100 being pressed downward. As a result, the material steel plate 100 may not be subjected to deformation of the periphery of the through hole 213. In addition, even in a process in which the plurality of first through holes 213 are continuously formed, it may be possible to prevent the material steel plate 100 from being curved.

Further, the die protrusion 132 may be formed to have a size that does not interfere with the adjacent first through hole 213 that has already been formed when the first through hole 213 is formed. For example, the plurality of first through holes 213 may be spaced apart from each other at regular intervals, wherein outer ends of the die protrusion 132 does not extend to neighboring first through holes 213, and the ends of the die protrusion 132 may be located in areas between the first through holes 213. That is, the diameter of the die protrusion 132 is larger than the diameter of the first through hole 213 and is formed smaller than a length obtained by adding the size of the first through hole 213 and twice the distance between the first through holes 213.

When the punch 110 penetrates the material steel plate 100 to form the through hole 213, the stripper 120 can press the material steel plate 100 from above. The lower surface of the stripper 120 may be formed in a planar shape, and thus the material steel plate 100 may be stably fixed.

The stripper 120 may have different shapes depending on types of the material steel plate 100. The stripper 120 shown in FIGS. 10 to 13 is described with reference to an example in which stainless steel is used as the material steel plate 100.

In some implementations, as shown in FIG. 14, a stripper depression 122*c* may be formed on a lower surface of the stripper 120. For example, the stripper depression 122*c* may be formed when the material steel plate 100 is formed of a VCM or PCM steel plate having a higher hardness than the stainless steel plate.

In some implementations, the stripper depression 122*c* provides a space above the die protrusion 132 when the punch 110 passes through the material steel plate 100 to make a force applied upward to the periphery of the first through hole 213 become greater.

Accordingly, when the material steel plate 100 having a high hardness is passed through, a portion to be deformed while the periphery of the first through hole 213 is pressed downward may be pushed upward, thus achieving compensation more effectively.

In some implementations, the stripper depression 122*c* may be formed along the periphery of the plate guide portion 122*a*. In addition, the width Ws of the stripper depression 122*c* may be formed to be wider than the width Wd of the die protrusion 132.

Accordingly, when viewed from above, the die protrusion 132 may be located in an inner area of the stripper depression 122*c*. In addition, the periphery of the stripper depression 122*c* may be formed to be inclined or rounded. That is, the stripper depression 122*c* may be formed to be more inclined or rounded as it goes from outer ends of the stripper depression 122*c* toward the center. Due to this structure, even though the stripper 120 and the punch 110 can press the material steel plate 100 in a state in which the material steel plate 100 is disposed between the stripper 120 and the die 130, it may be possible to prevent the material steel plate 100 from being pinched, deformed, or sheared between the stripper depression 122*c* and the periphery of the die protrusion 132.

In addition, the size of the lower surface of the stripper 120 may be formed to be larger than the die protrusion 132 such that the stripper depression 122*c* can be formed, and the stripper 120 may be formed in a size such that a burr around the neighboring first through hole 213 can be pressed in a process in which the stripper 120 presses the material steel plate 100.

In some implementations, the stripper 120 may be formed to have a size capable of covering at least one or more neighboring first through holes 213, which have been formed, including the first through holes 213 being processed by the punch 110. For example, the diameter of the lower surface of the stripper 120 may be larger than a length obtained by adding diameters of at least two first through holes 213 and a distance between the first through holes 213.

Therefore, when the stripper 120 presses the material steel plate 100 to form the first through hole 213, the stripper 120 may press a previously-formed first through hole 213 adjacent to the first through hole 213 being processed from above. In this case, burrs protruding downward from the periphery of the first through hole 213 may be pressed. While the plurality of first through holes 213 are being processed, the stripper 120 may repeatedly press the material steel plate 100, and thus the burrs may be continuously pressed, so that the burrs do not protrude to the rear surface of the material steel plate 100 and the rear surface of the material steel plate 100 is flattened.

On the other hand, in order to form a plurality of the first through holes 213, the punch 110, the stripper 120, and the die 130 may not be moved in the horizontal direction and may be maintained in a fixed state, and the material steel plate 100 may be moved to a position of which the numerical value is input. The process is performed very quickly and continuously, and in this process, the material steel plate 100 may be quickly moved while being seated on the upper surface of the die 130. In addition, in the process in which the material steel plate 100 may be continuously moved, a protruding portion of the rear surface of the through hole 213 such as a burr may be flattened.

As shown in FIG. 15, the material steel plate 100 may be horizontally moved on the upper surface of the die whenever a plurality of the first through holes 213 are formed, and the punch 110 and the stripper 120 may be moved in the vertical direction sequentially. In this process, the burr protruding from the rear surface of the first through hole 213 may be partially removed.

In some implementations, the material steel plate 100 may be moved in a horizontal direction with respect to the upper surface of the die 130 whenever the first through holes 213 are formed one by one in a state in which the material steel plate 100 is seated on the die 130. For example, a position to which the material steel plate 100 is moved may be a position at which the first through hole 213 is to be formed, and thus the material steel plate 100 may be moved within several tens of micrometers to several millimeters. Further, the first through holes 213 can be concentrated in a narrow area, and thus the material steel plate 100 can be repeatedly horizontally moved as many as the number of first through holes 213, that is, tens to hundreds of times.

In the process of forming the first through holes 213 by the cutting edge part 112, the upper portion of the through hole 213 close to the front surface of the material steel plate 100 may have the same cut surface as the dimension of the cutting edge part 112. However, the lower portion of the through hole 213 may be fractured, and burrs protruding rearward along the periphery of the through hole 213 may be generated.

When the material steel plate 100 is loaded or moved in the state in which the burr is generated, there can be a problem in which the burr may damage the surface of another material steel plate 100 loaded, and the diffusion sheet 28 can not firmly attached thereto. As a result, there may be a problem in which the diffusion sheet 28 peels off or a defect occurs when the hole-filling member 214 is provided. Therefore, it can be necessary to remove the burr.

In some implementations, the material steel plate 100 can be repeatedly horizontally moved while being seated on the upper surface of the die 130, so that the protruding burr can be scratched while being continuously in contact with the periphery of the die protrusion 132, and can be removed while being pressed by the die protrusion 132 when the punch 110 is continuously moved up and down.

That is, the burr may be removed while the material steel plate 100 is moved such that the plurality of first through holes 213 can be continuously formed, and the rear surface of the material steel plate 100, in particular, the periphery of the rear surface of the first through hole 213 may be smooth without burrs. Accordingly, a process in which the material steel plate 100 is repeatedly horizontally moved along the die 130 in order to form the plurality of through holes 213 may be referred to as a deburring process and the deburring process may be made together during the process of forming the first through holes 213.

Therefore, when the plurality of first through holes 213 have all been formed, the periphery of the rear surface of the first through hole 213 may be in a planar shape, and it may not be necessary to additionally perform a separate process for removing burrs from the rear surface of the material steel plate 100.

Hereinafter, the shape of the first through hole 213 formed will be described with reference to the figures.

Figure 16:
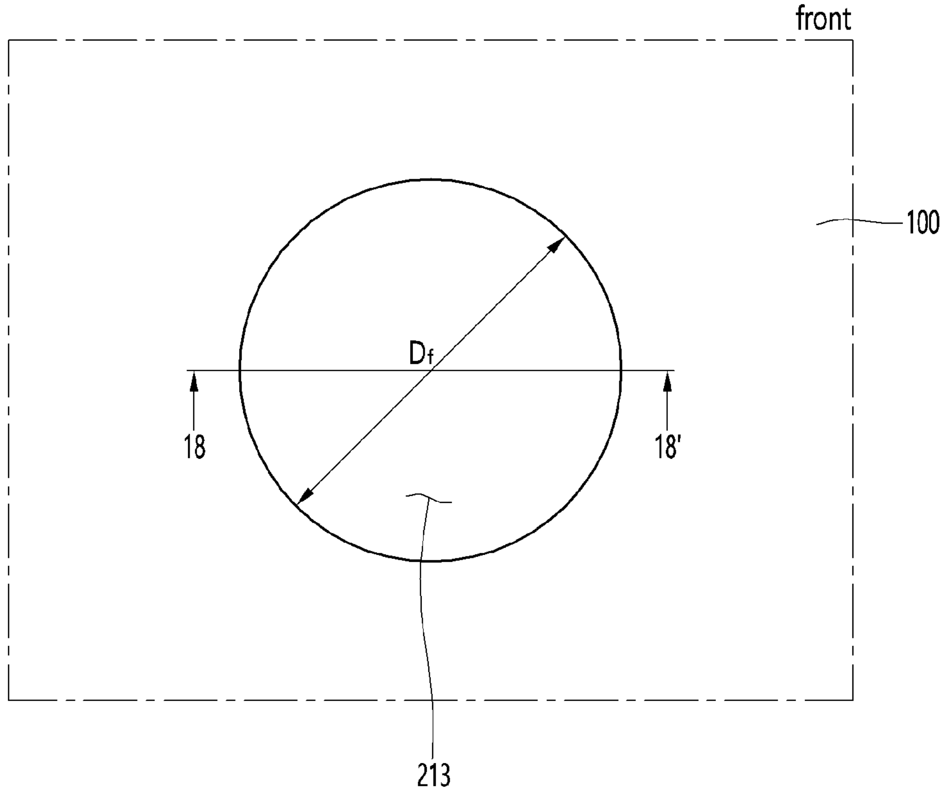
FIG. 16 is a view showing an example configuration of the through hole as viewed from above.
Figure 17:
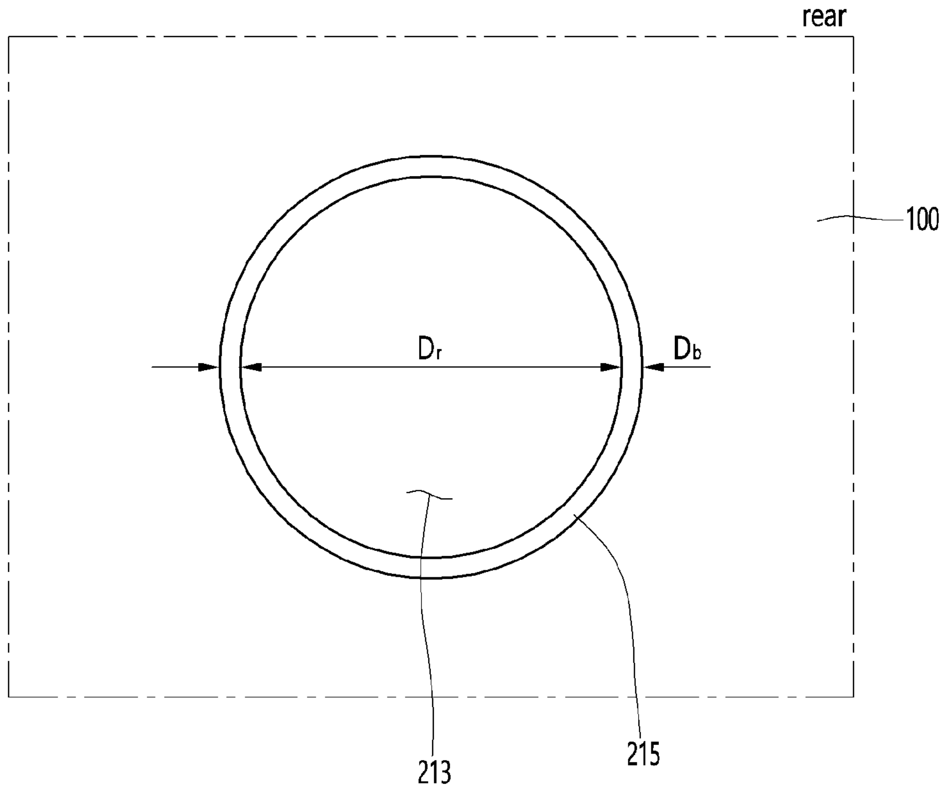
FIG. 17 is a view showing an example configuration of the through hole as viewed from below.
Figure 18:
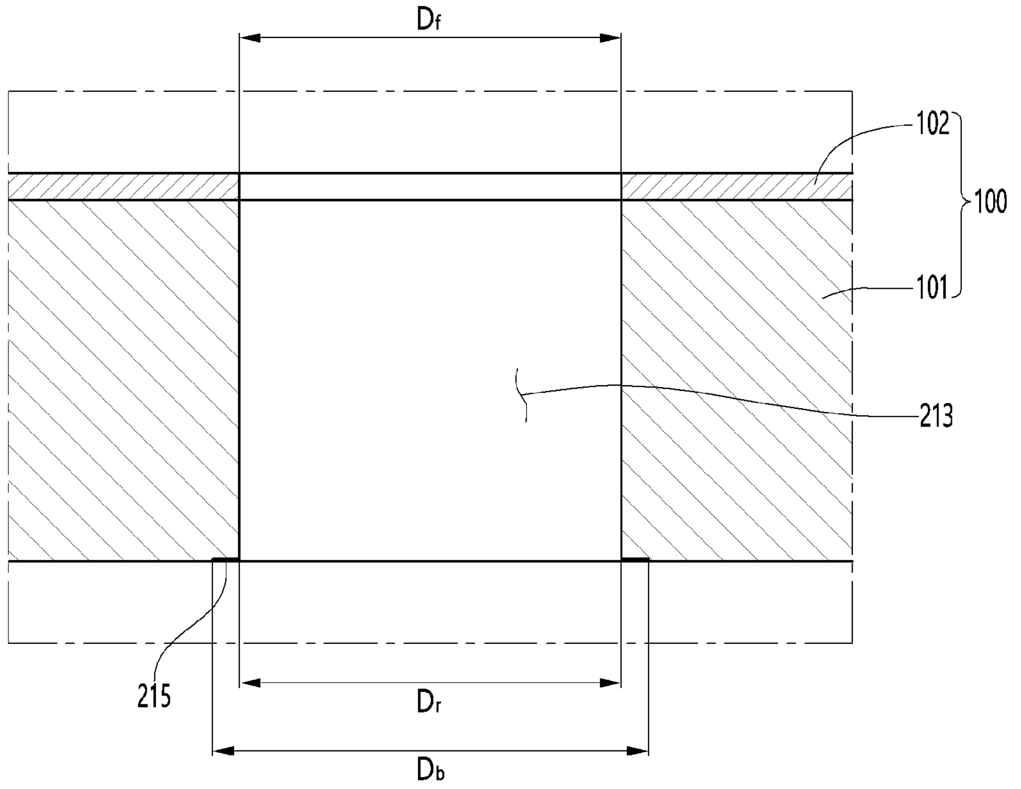
FIG. 18 is a cross-sectional view showing an example configuration of the through hole taken along line 18-18' of FIG. 16.

FIG. 16 is a view showing the through hole as viewed from above. FIG. 17 is a view of the through hole as viewed from below. In addition, FIG. 18 is a cross-sectional view taken along line 18-18' of FIG. 16.

In some implementations, when the first through holes 213 have been formed in the material steel sheet 100, the front surface of the material steel sheet 100 may have the through holes 213 with a set diameter Df. The diameter Df of the front surface of the through hole 213 may be formed to always have a predetermined length by the cutting edge part 112.

In addition, until the hole-filling member 214 is provided in the material steel plate 100, the first protective film 102 can be attached to the front surface of the steel plate 101. For example, the material steel plate 100 may include the first protective film 102 and the steel plate 101, wherein the punch 110 can sequentially pass through the first protective film 102 and the steel plate 101 to form the first through hole 213.

In a state in which the first through hole 213 is formed by the cutting edge part 112, the diameter Dr of the rear surface of the first through hole 213 may be equal to or slightly larger than the diameter Df of the front surface. The diameter Dr of the rear portion of the through hole may vary depending on the degree of wear of the cutting edge part 112 or the hardness of the steel plate 101. For example, when the through holes are continuously formed in the material steel sheets of a very large quantity, such that the lower end of the cutting edge part 112 can be worn, or when the steel sheet 101 is formed of a material with a low hardness, the first through hole 213 may be formed while the lower end of the first through hole 213 is being fractured in the process of forming the first through hole 213. In this case, the diameter Dr of the rear surface of the first through hole 213 may be slightly larger than the diameter Df of the front surface. However, a difference between the diameters of the front and rear surfaces of the first through hole 213 is substantially the same to a degree that cannot be distinguished by the naked eye.

In some implementations, in the process of forming the plurality of first through holes 213, burrs formed around the first through holes 213 may be worn or pressed. Accordingly, a region around the rear surface of the first through hole 213 may have a planar shape without a protruding portion.

In addition, a planarization region 215 may be formed around the rear surface of the first through hole 213. The planarization region 125 is a portion where the burr can be pressed or worn by the die protrusion 132 and may be formed when the burr is removed. Accordingly, the planarization region 125 may not protrude from the rear surface of the material steel plate 100, but may have a slightly different color from other portions of the rear surface of the material steel plate 100 due to wear.

In some implementations, the planarization region 215 can be formed along the periphery of the first through hole 213, and the planarization region 215 can have a predetermined width. That is, when the rear surface of the material steel plate 100 is viewed, one circle can be formed along the diameter Dr of the rear surface of the through hole, and another circle which is concentric with the first through hole 213 and has a larger diameter Db can be formed. In some implementations, the rear surface of the first through hole 213 can correspond to inner ends of the planarization region 215, and a circle outside the first through hole 213 may correspond to outer ends of the planarization region 215.

With respect to the relationship between the front and rear surfaces of the first through hole 213 and the diameters of the planarization region 215, the diameter Df of the front surface of the first through hole 213 can be the smallest, the diameter Dr of the rear surface of the first through hole 213 can be equal to or greater than the diameter Df of the front surface, and the diameter Db of the planarization region 215 at the outer ends may be larger than the diameter Dr of the rear surface of the first through hole 213.

In some implementations, it can be clearly seen from the shape of the rear surface of the material steel plate 100 that the first through holes 213 can be continuously formed one by one while the material steel plate 100 is moved using the manufacturing apparatus 2.

Hereinafter, the shapes of the first through holes 213 formed according to the types of the steel plate 101 will be described with reference to enlarged photographs.

Figure 19:
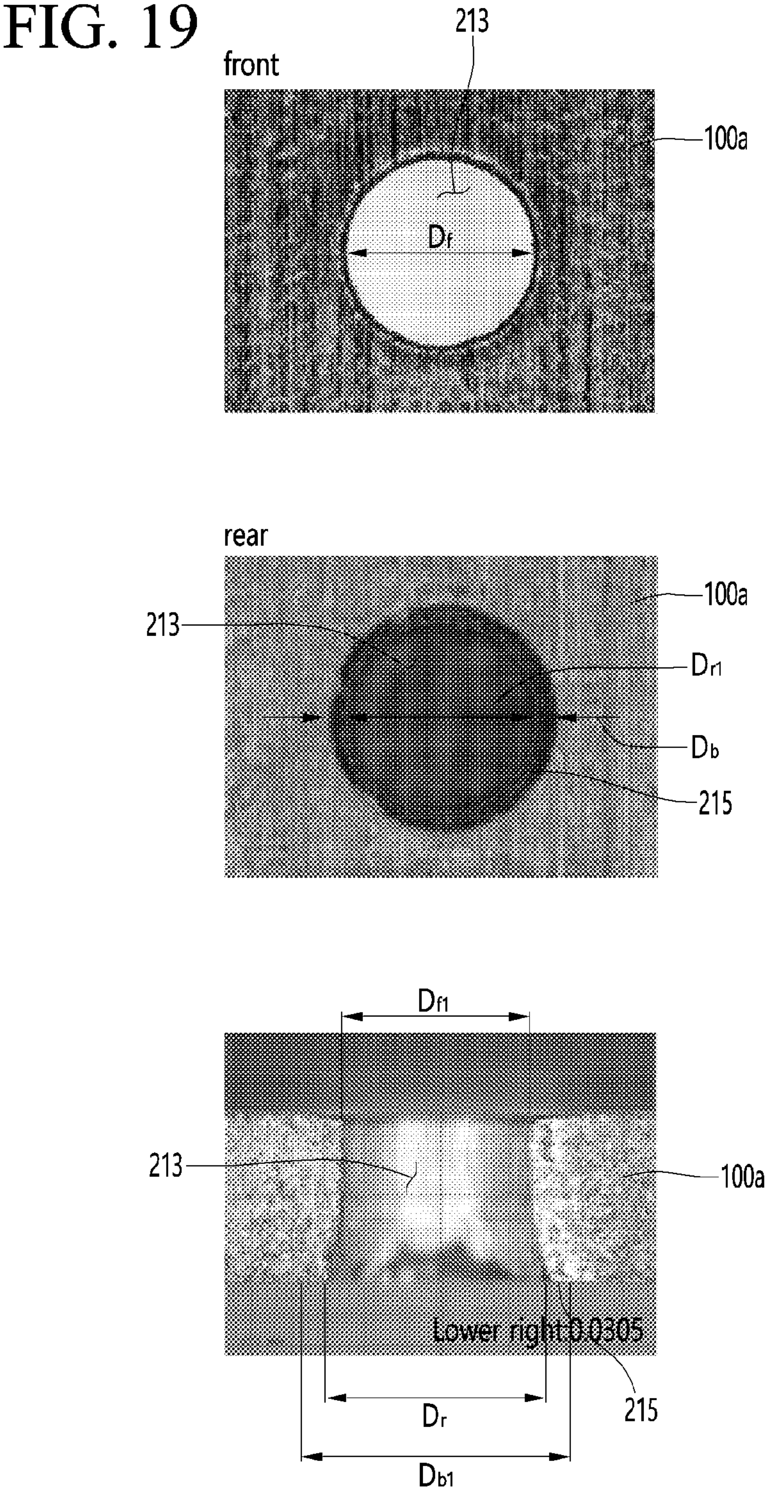
FIG. 19 is a set of photographs of a front surface, a rear surface, and a cross section of a stainless steel plate in which the through hole is formed.

FIG. 19 is a photograph of a front surface, a rear surface, and a cross section of a stainless steel plate in which the through hole is formed, as an example of the out plate.

As shown in the figure, the material steel plate 100 may include the stainless steel plate **100*a* and the first protective film 102, wherein the first through holes 213 are formed to pass through the material steel plate 100**.

As shown, the first through holes 213 having a predetermined diameter Df may be formed in the front surface of the material steel plate 100. In addition, a diameter Dr1 of the rear surface of the first through hole 213 may be slightly larger than the diameter Df of the front surface. The stainless steel sheet **100*a* has a relatively low hardness compared to the VCM steel sheet or the PCM steel sheet, and thus the first through hole 213 can be fractured at the rear surface of the first through hole 213 during the forming process, so that the diameter Dr1 thereof can become slightly larger. Of course, the difference may be seen as a large difference in a photograph obtained by taking a cross section, but it can be difficult to distinguish with the naked eye a difference between the front and rear diameters of the first through hole 213**, which can be approximately 0.06 mm.

In addition, a planarization region 215 which is concentric with the first through hole 213 may be formed to have a predetermined width along the periphery of the rear surface of the first through hole 213. The outer ends of the planarization region 215 may be formed to have a predetermined diameter Db1.

Figure 20:
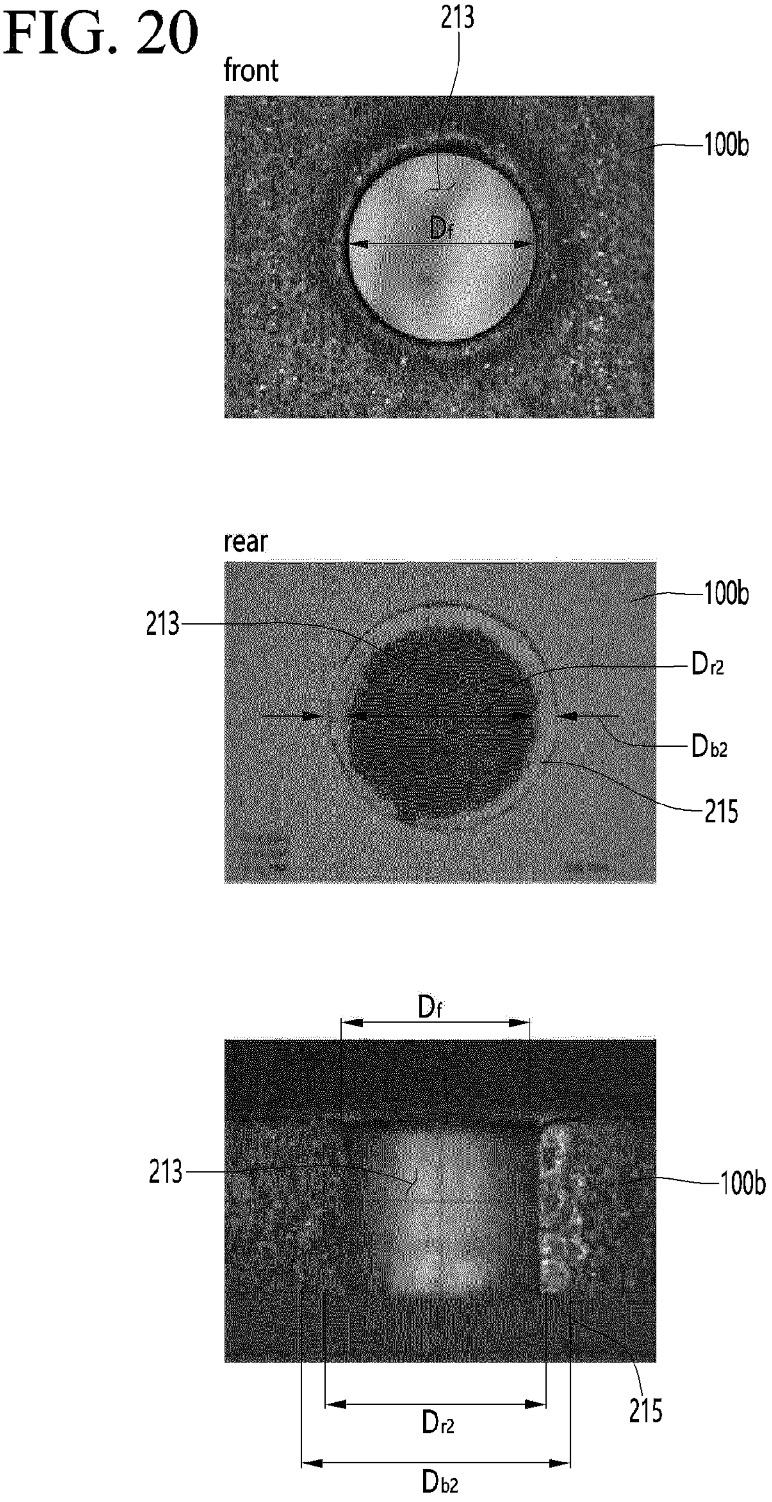
FIG. 20 is a set of photographs of a front surface, a rear surface, and a cross section of a pre-coated metal (PCM) steel plate in which the through hole is formed.

FIG. 20 is a photograph of a front surface, a rear surface, and a cross section of a PCM steel plate in which the through hole is formed, as an example of the out plate.

In some implementations, the material steel plate 100 may include a PCM steel plate **100*b* and the first protective film 102**. In addition, a through hole can be formed through the material steel plate.

As shown, the first through holes 213 having a predetermined diameter Df may be formed in the front surface of the material steel plate 100. In addition, the diameter Dr2 of the rear surface of the first through hole 213 can be approximately the same as the diameter Df of the front surface, and may be formed to be approximately 0.001 mm larger. The PCM steel plate 100*b* has a relatively high hardness compared to the stainless steel plate or the VCM steel plate, and thus may be neatly sheared to the rear surface of the first through hole 213 in the forming process of the first through hole 213.

In addition, the planarization region 215 which can be concentric with the first through hole 213 may be formed to have a predetermined width along the periphery of the rear surface of the first through hole 213. The outer ends of the planarization region 215 may be formed to have a predetermined diameter Db2.

Figure 21:
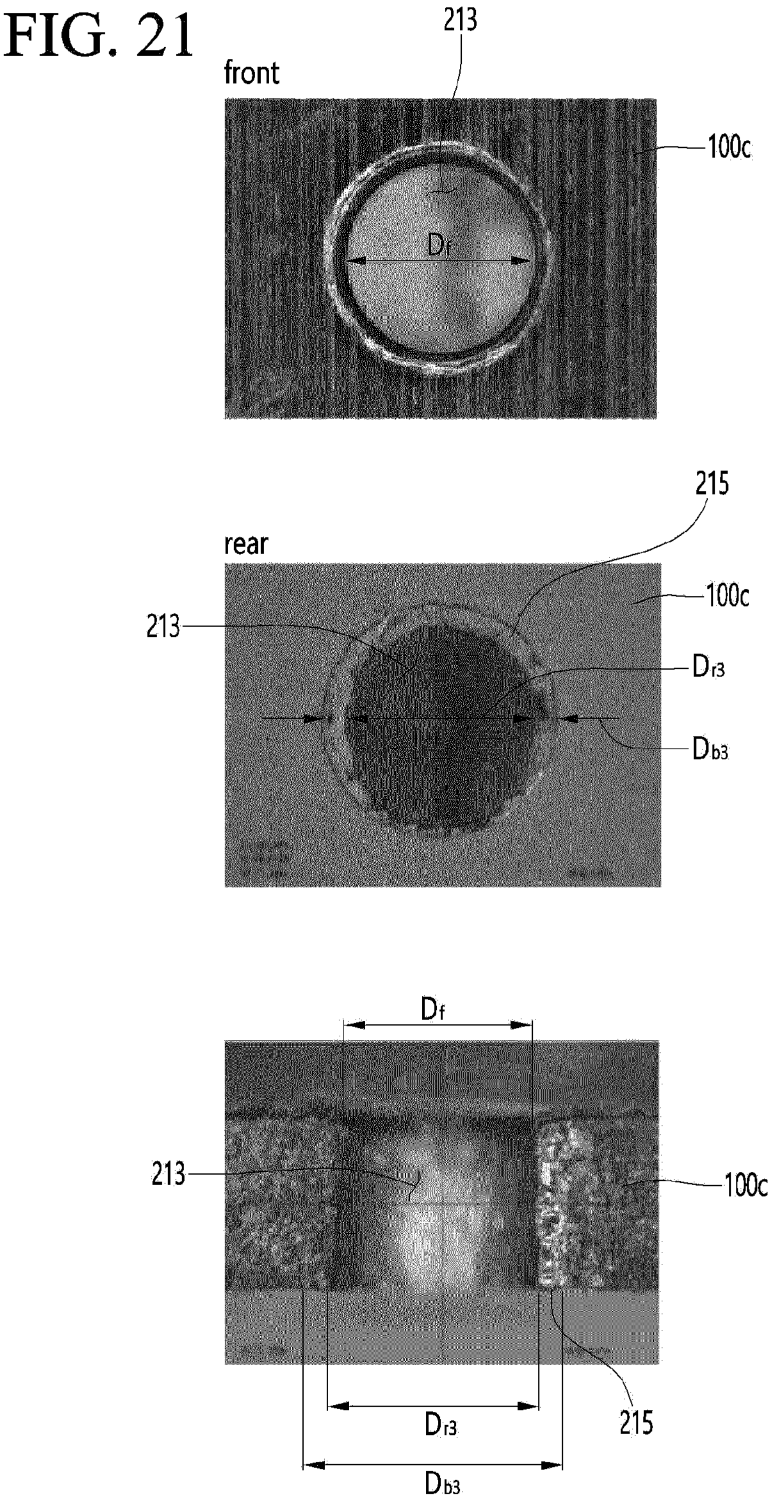
FIG. 21 is a set of photographs of a front surface, a rear surface, and a cross section of a vinyl-coated metal (VCM) steel plate in which the through hole formed.

FIG. 21 is a photograph of a front surface, a rear surface, and a cross section of a VCM steel plate in which the through hole is formed, as an example of the out plate.

In some implementations, the material steel plate 100 may include the VCM steel plate 100*c* and the first protective film 102. In addition, the first through hole 213 can be formed by passing through the material steel plate 100.

As shown, the first through holes 213 having a predetermined diameter Df may be formed in the front surface of the material steel plate 100. In addition, a diameter Dr3 of the rear surface of the first through hole 213 may be slightly larger than a diameter Df of the front surface. The VCM steel plate 100*c* has a relatively low hardness compared to the PCM steel plate, but has a higher hardness than the stainless steel plate, and thus, the first through hole 213 can be fractured at the rear surface of the first through hole 213 during the forming process, so that the diameter Dr3 thereof becomes slightly larger. Of course, the difference may be seen as a large difference in a photograph obtained by taking a cross section, but it can be difficult to distinguish with the naked eye a difference in diameters, which can be approximately 0.01 mm.

In addition, the planarization region 215 which can be concentric with the first through hole 213 may be formed to have a predetermined width along the periphery of the rear surface of the first through hole 213. The outer ends of the planarization region 215 may be formed to have a predetermined diameter Db3.

In the above-described material steel sheets 100*a*, 100*b*, 100*c*, it can be seen that the sizes of the first through holes 213 can be substantially the same as each other when checked with the naked eye, and the planarization region 215 can be formed along the periphery of the rear surface of the first through hole 213.

In some implementations, after forming the first through hole 213 in the material steel plate 100, a hole-filling member 212 may be provided in the inside of the through hole 213. Hereinafter, the process of providing the hole-filling member 214 will be described in more detail with reference to the drawings.

Figure 23:
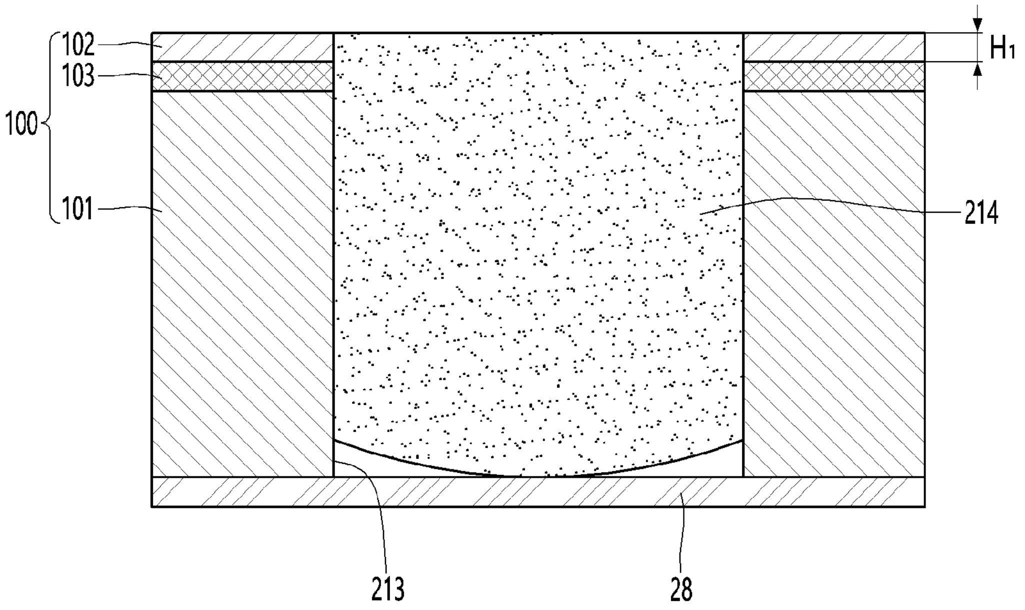
FIG. 23 is a cross-sectional view showing an example configuration of the through hole, wherein the through hole is filled with the hole-filling member.
Figure 24:
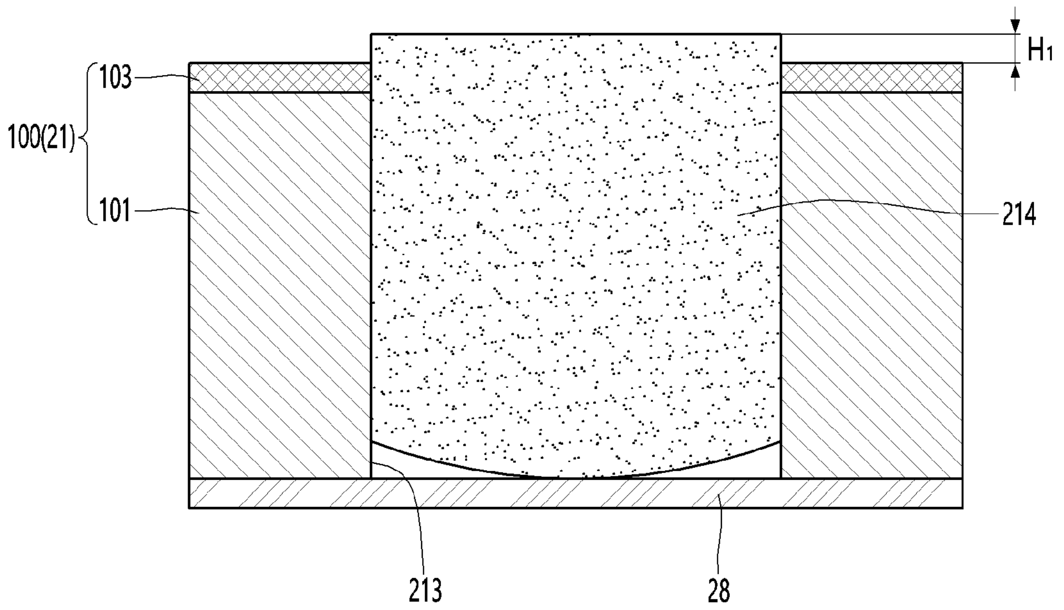
FIG. 24 is a cross-sectional view showing an example configuration of a through hole in a steel plate, wherein the through hole is filled with the hole-filling member and a first protective film of the steel plate is removed.
Figure 25:
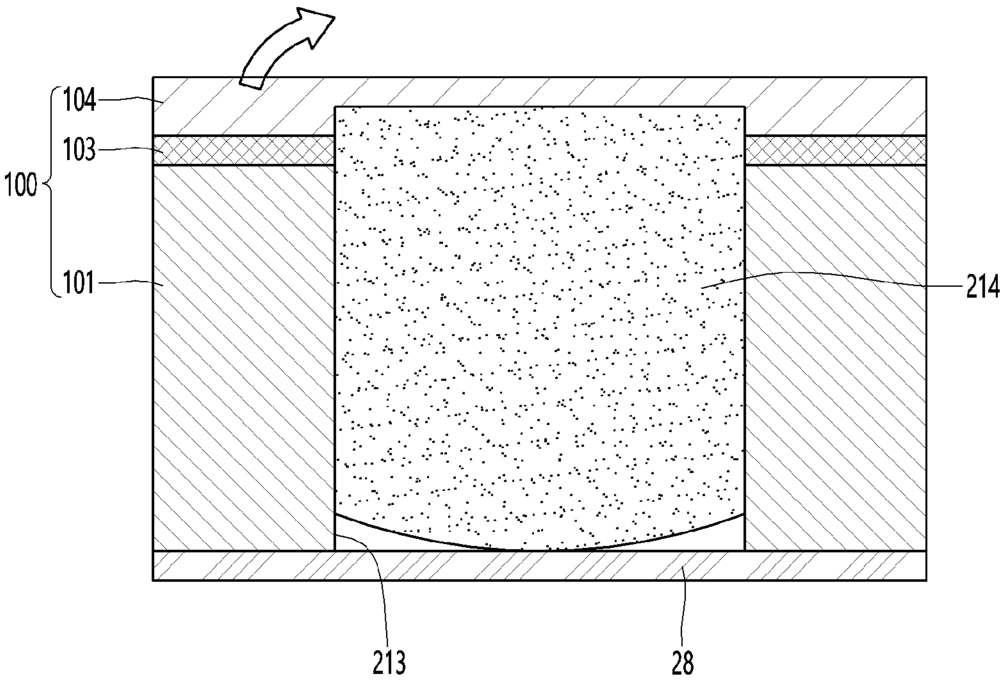
FIG. 25 is a cross-sectional view showing an example configuration of a through hole in a steel plate, wherein the through hole is filled with the hole-filling member and a second protective film is attached to the steel plate.
Figure 26:
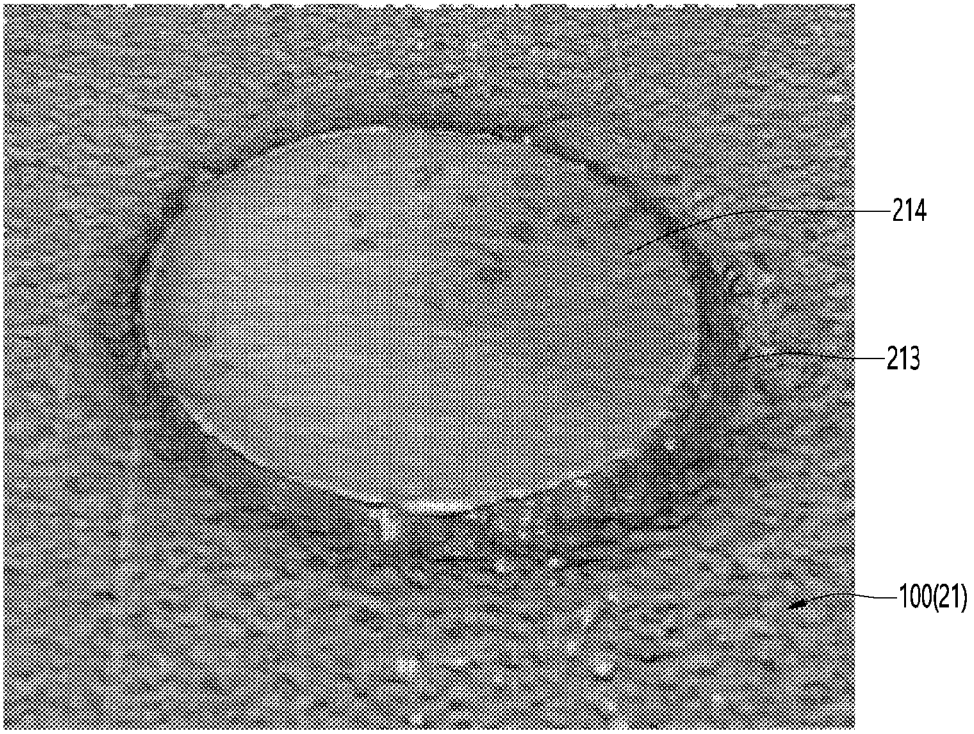
FIG. 26 is an enlarged photograph of a through hole of a manufactured out plate.

FIG. 22 is a cross-sectional view showing a process of filling a through hole with a hole-filling member. FIG. 23 is a cross-sectional view showing a state in which the through hole is filled with the hole-filling member. FIG. 24 is a cross-sectional view showing a state in which a first protective film of a steel plate in which the hole-filling member is provided is removed. FIG. 25 is a cross-sectional view showing a state in which a second protective film is attached to the steel plate in which the hole-filling member is provided. FIG. 26 is an enlarged photograph of a through hole of a manufactured out plate.

As shown in the figures, the material steel plate 100 in a state in which the first through holes 213 are formed may be provided with the hole-filling member 214, and the hole-filling member 214 may be formed by filling the first through holes 213 with the hole-filling material and then curing the hole-filling material.

In addition, the hole-filling member 214 may be formed by a silk screen printing method. For example, all of the first through holes 213 may be simultaneously filled in such a way to supply the hole-filling material to the mesh screen 140 and then push the hole-filling material with the squeeze 150 to fill the plurality of first through holes 213 with the hole-filling material.

In some implementations, the material steel plate 100 may be disposed such that the front surface thereof faces the upper side, and the hole-filling material is filled through the open upper surface of the first through holes 213. In this case, the diffusion sheet 28 can be attached to the open rear surfaces of the first through holes 213 so that the hole-filling material filled in the first through holes 213 can remain filled in the first through holes 213.

In addition, the material steel plate 100 can be in a state in which the first protective film 102 is attached to the front surface of the steel plate 101, and the first protective film 102 is perforated in the same shape as the first through holes 213. As a result, the first protective film 102 may function as a mask such that the hole-filling material is not deposited around the first through holes 213.

In some implementations, the material steel plate 100 may further include an exterior layer 103. The exterior layer 103, which defines the front surface of the out plate 21 may be formed on the front surface of the steel plate 101 and protected by attaching the first protective film 102 thereto. The exterior layer 103 can define the appearance represented by the out plate 21, and may include various layers formed on the front surface of the steel plate 101 to define the appearance, including, but not limited to, a layer representing a color, a deposition layer or a hairline layer for representing a metal texture, an anti-fingerprint coating layer for preventing fingerprints, and the like.

The mesh screen 140 may be disposed at a position corresponding to the front surface of the material steel plate 100. In this state, the mesh screen 140 may be disposed to cover all of the plurality of first through holes 213.

In some implementations, when the hole-filling material is supplied to the upper surface of the mesh screen 140 and then moved while pressing the mesh screen 140 with the squeeze 150, the hole-filling material may be filled in the first through holes 213 while passing through the mesh screen 140. The hole-filling material may be injected through the front of the first through holes 213, that is, the open front surface, and may be filled to a height corresponding to the first protective film 102 by the squeeze 150. The plurality of first through holes 213 may be filled to the same height at the same time. In particular, since the hole-filling material is filled from the front of the first through holes 213, the front parts of the first through holes 213 can be completely filled when viewed from the front of the first through holes 213. In addition, the diffusion sheet 28 may shield the rear surfaces of the first through holes 213 to prevent the hole-filling material from being discharged through the rear of the first through holes 213.

When the hole-filling material is filled in the first through holes 213 from the rear, the hole-filling material may not be filled in the front of the first through holes 213 due to air bubbles, resulting in poor appearance. In particular, when a portion in which the hole-filling member 214 is not formed is present in the front of the first through holes 213, the appearance of the display part 211 can be deteriorated because foreign substances are caught in the first through holes 213 or the transmission of light is not constant.

In particular, in the case of attaching a sheet to the front surface of the steel plate, there can be a problem in which the cured hole-filling material reacts with the adhesive of the sheet, wherein a part of the hole-filling member is peeled off with the sheet when the sheet is removed after the hole-filling material is cured. In some implementations, this may cause an appearance problem.

However, the hole-filling member 214 may be formed while the hole-filling material is filled in the first through holes 213 from the front thereof, wherein the front portion of the hole-filling member 214 may be completely filled. In addition, the front surface of the hole-filling member 214 may become flat by the squeeze 150. In addition, since the diffusion sheet 28 on the rear portion of the hole-filling member 214 may remain in an attached state, there is no need to remove the diffusion sheet 28, so that the peeling of the hole-filling member 214 does not occur. In addition, even when air bubbles are generated on the rear surfaces of the first through holes 213 contacting the diffusion sheet 28, the rear surface of the steel plate 101 is a portion that is not exposed to the outside, thus not causing a problem.

In some implementations, the hole-filling material may be made of a transparent or semi-transparent material in a cured state so as to transmit light. In addition, the hole-filling material may be made of a material capable of being cured by UV irradiation. For example, the hole-filling material may be formed of an acrylate-based resin material as a UV hole-filling material. Therefore, a dry process of irradiating ultraviolet rays with a UV lamp may be performed after the hole-filling material is filled in the first through holes 213. The hole-filling material may be cured by the dry process to form the hole-filling member 214.

In addition, the hole-filling material may be formed to have a set viscosity. When the viscosity of the hole-filling material is too high, it is difficult to fill the inside of the fine first through holes 213. In addition, when the viscosity of the hole-filling material is too low, there may occur a problem in which the hole-filling material may permeate between the first protective film 102 and the front surface of the steel plate 101 when the hole-filling material is filled in the first through holes 213. In addition, when the hole-filling material has an appropriate viscosity, adhesion to the inner surface of the first through hole 213 may be excellent, thus preventing the peeling of the cured hole-filling member 214.

In some implementations, the hole-filling material may be formed to have a viscosity of approximately 500 Cps to 10000 Cps. The viscosity of the hole-filling material may be set differently according to a type of the steel plate in which the first through holes 213 are formed. For example, when the stainless steel plate 100*a* and the PCM steel plate 100*b* are used as the material steel plate 100, the first through holes 213 may be effectively filled even when the viscosity is low, and the hole-filling material may be formed to have a viscosity of about 4000 Cps or less such that the hole-filling material does not permeate between the first protective film 102 and the front surface of the steel plate 101. In addition, when a VCM steel plate 100*c* is used as the material steel plate 100, it may be needed that the hole-filling material does not permeate not only between the first protective film 102 and the steel plate, but also between a coating layer on the surface of the VCM steel plate 100*c* and the steel plate. Therefore, the hole-filling material may need to have a relatively high viscosity and may be formed to have a viscosity of approximately 400 Cps to 10000 Cps.

As shown in FIG. 23, when the hole-filling material has been cured in a state in which the hole-filling material completely fills the first through holes 213, the first protective film 102 may be removed. That is, after the hole-filling material is cured and the molding of the hole-filling member 214 is completed, the first protective film 102 is no longer required, and the first protective film 102 is removed to provide the touch operation part 212 on the surface of the steel plate 101.

When the first protective film 102 is removed, foreign substances deposited around of the first through holes 213 may be removed in the process of filling the hole-filling material, and the hole-filling member 214 only remains on the front surface of the steel plate 101. That is, the first protective film 102 may serve as a mask to protect the steel plate 101 before the process of filling the hole-filling material.

As shown in FIG. 24, when the first protective film 102 has been removed, the hole-filling member 214 may protrude from the front surface of the steel plate 101 by the thickness H1 of the first protective film 102. Therefore, it is preferable that the first protective film 102 be formed to have a thickness H1 as thin as possible while protecting the surface of the steel plate 101, wherein the first protective film 102 may be formed to have a thickness of approximately 50 μm or less.

In some implementations, when the first protective film 102 has been removed, the touch operation part 212 may be formed on the front surface of the steel plate 101. For example, the touch operation part 212 may be formed on the front surface of the steel plate 101 through printing or surface processing.

After printing of the touch operation part 212 is completed, a second protective film 104 may be attached to the front surface of the steel plate 101 as shown in FIG. 25. The state in which the second protective film 104 is attached to the steel plate 101 is also a state before the out plate 21 is formed and thus may be referred to as a material steel plate 100.

The second protective film 104 may be formed to have a sufficient thickness such that the front surface of the material steel plate 100 is protected from damage even when the material steel plate 100 is transported and stored in a stacked state. For example, the second protective film 104 may be formed to be thicker than the thickness of the first protective film 102.

In some implementations, the second protective film 104 may be attached to cover the entire front surface of the material steel plate 100 including the hole-filling member 214. The material steel plate 100 may be bent by sheet metal processing before being assembled with the door 20 while the second protective film 104 can be attached to the material steel plate 100, thus defining the shape of the out plate 21.

Further, after the out plate 21 is finally formed and assembled to the door 20, the second protective film 104 may be removed. Since the second protective film 104 can be attached after the hole-filling material is completely cured to form the hole-filling member 214, the adhesive of the second protective film 104 may not react with the hole-filling member 214, and thus, the hole-filling member 214 may not peel off even when the second protective film 104 is removed.

In some implementations, when the second protective film 104 is removed, the hole-filling member 214 may have a shape slightly protruding from the front surface of the out plate 21 as shown in FIG. 26.

In this case, the protruding height H1 of the hole-filling member 214 may have a height H1 corresponding to the thickness of the first protective film 102. For example, the height of the hole-filling member 214 protruding from the front surface of the out plate 21 may be 50 μm or less. Therefore, the hole-filling member 214 may protrude to a very small height, and the height may not be recognized well when viewed by the user. In addition, the periphery of the hole-filling member 214 can be formed to be inclined or rounded by contraction in the process of curing the hole-filling material so that the hole-filling member 214 may not peel off even when the user touches the hole-filling member 214 or wipe the out plate 21 for cleaning.

In some implementations, the following effects can be expected.

When compared with etching or laser processing for forming the through hole in the out plate, the through hole can be physically formed by drilling the through hole, thus forming through holes having a uniform size. In particular, the appearance quality can be greatly improved when the through holes are formed uniformly in size according to the characteristics of the out plate for a refrigerator in which a plurality of fine through holes are formed and light passes through the through holes.

In addition, since the through hole is formed by a punch, a separate masking operation is unnecessary. Since it is not necessary to use large and complicated etching equipment, manufacturing cost is reduced and the process is simplified.

In some implementations, damage to the coating layer or film of the steel plate may inevitably occur and burrs can be generated due to thermal deformation in a periphery of the through hole during laser processing. However, damage to the coating layer and film of the steel plate during processing by a punch may not occur, and there can be an advantage that burrs may not occur in the periphery of the through hole.

For example, the through holes can be formed one by one by a punch in manufacturing the out plate, and in this process, a stripper that presses the material steel plate can move up and down to repeatedly press the material steel plate. In particular, the stripper can press down on the formed through holes adjacent to the through holes being formed, and eventually, the burrs formed in the formed through holes can be continuously and repeatedly pressed by a force with which the stripper presses downward. Accordingly, the burr can be pressed on the rear surface of the material steel plate, resulting in a flattened rear surface in which the burr may not protrude.

In addition, in order to form a plurality of through holes, the steel plate may be horizontally moved while being seated on the die. In the process of horizontal movement of the material steel plate, burrs and protrusions protruding from the rear surface of the through holes can be polished by the die protrusion of the die due to friction or can be wiped by the lifting and lowering of the punch, thereby resulting in no protrusions in the rear surface of the through holes. That is, burrs or protrusions formed during processing of the through hole may be further removed during the transporting process for forming the through hole.

Accordingly, the rear surface of the through hole may be flattened, and thus, there may be no need to additionally proceed with a separate deburring operation, thereby simplifying the manufacturing process, reducing manufacturing cost, and improving productivity.

In some implementations, there is an advantage in that the diffusion sheet can be more effectively attached to the steel plate having the through hole formed therein by removing the burr or the protruding portion on the rear surface of the through hole. In addition, since the diffusion sheet can be in close contact with the steel plate, there can be an advantage of preventing the occurrence of defects by preventing leakage of the hole-filling material filled for molding the hole-filling member.

In addition, the punch can penetrate the first protective film and the steel plate constituting the material steel plate at the same time to form the through hole. Accordingly, the front circumference of the through hole may be covered by the first protective film, and may serve as a mask when the hole-filling material for forming the hole-filling member is filled.

That is, when providing the hole-filling material, a separate masking operation may not be required, and additional processes and configurations can be omitted by using the first protective film, thereby improving productivity.

In addition, the hole-filling material can be provided in the front surface of the steel plate, and a diffusion sheet can be attached to the rear surface of the steel plat to shield the rear surface of the through hole such that the hole-filling material is filled therein. Therefore, it can be possible to form the hole-filling member by providing the hole-filling material and using the diffusion sheet without adding a separate shielding configuration, thereby simplifying the process and further improving productivity.

In addition, by having a structure in which the hole-filling material for forming the hole-filling member is provided from the front of the through hole, it can be possible to prevent a problem in that the hole-filling material is not mixed with air bubbles when viewed from the front of the out plate and the hole-filling member completely fills the front surface of the through hole. Accordingly, a defect in appearance can be prevented, and when a foreign substance is caught in the through hole during cleaning or when light is transmitted, a defect can be prevented.

In addition, since the hole-filling material can be filled from the front surface of the through hole, the second protective film can be attached after the hole-filling member is completely cured. Therefore, even when the second protective film is attached, a reaction between the adhesive of the second protective film and the hole-filling member can be prevented, and thus, when the second protective film is removed, the front surface of the hole-filling member is prevented from being peeling off. Therefore, there can be an advantage of improving the appearance quality of the out plate.

What is claimed is:

1. A method for manufacturing an out plate for a refrigerator, wherein the out plate defines a front surface of a door of the refrigerator, the method comprising:

providing a steel plate with a first protective film attached to a front surface thereof; forming a plurality of through holes in the steel plate, the forming step comprising:

seating the steel plate on a die and forming one of the plurality of through holes by a movement of a punch, and moving the steel plate to one of a plurality of set positions to form another one of the plurality of through holes by the punch;

attaching a diffusion sheet configured to shield the plurality of through holes on a rear surface of the steel plate;

providing a hole-filling material through an open front surface of one of the plurality of through holes to form a hole-filling member configured to shield the one of the plurality of through holes, wherein the hole-filling material is provided to a height corresponding to a height of an upper surface of the first protective film; and removing the first protective film, wherein the first protective film is configured to restrict the hole-filling material from being deposited around the plurality of through holes;

wherein each of the plurality of through holes is formed by penetrating the first protective film and the steel plate with the punch prior to removing the first protective film, and wherein the moving of the steel plate and the forming of one of the plurality of through holes by the punch are repeatedly performed while the steel plate is seated on the die at other ones of the plurality of set positions.

2. The method of claim 1, wherein the plurality of set positions corresponds to a plurality of positions of the plurality of through holes.

3. The method of claim 1, wherein the rear surface of the steel plate is in contact with an upper surface of the die, and wherein the front surface of the steel plate defines an outer surface of the door.

4. The method of claim 1, wherein the hole-filling member is configured to allow transmission of light.

5. The method of claim 4, wherein the first protective film is removed after the hole-filling member is formed, and wherein a thickness of the first protective film has a thickness of 50 μm or less.

6. The method of claim 4, further comprising:

defining an operation part configured to guide a user's operation in the front surface of the steel plate, wherein the first protective film is removed after the hole-filling member is formed.

7. The method of claim 6, wherein the operation part is defined on the front surface of the steel plate by printing or surface processing.

8. The method of claim 4, wherein the hole-filling material is provided on all the plurality of through holes by a printing method.

9. The method of claim 4, further comprising:

attaching a second protective film configured to shield the front surface of the steel plate including a front surface of the hole-filling member, wherein the first protective film is removed after the hole-filling member is formed.

10. The method of claim 9, wherein the thickness of the first protective film is formed to be thinner than a thickness of the second protective film.

11. The method of claim 10, wherein the front surface of the hole-filling member is formed to protrude more than the front surface of the steel plate when the second protective film is removed.

12. The method of claim 9, wherein the second protective film is removed after the steel plate is assembled to the door, and after the steel plate has been subjected to sheet metal processing.

* * * * *